(12) United States Patent
Bashkin

(10) Patent No.: US 12,323,743 B2
(45) Date of Patent: Jun. 3, 2025

(54) STORAGE ROOM WITH INVENTORY CONTROL

(71) Applicant: 3 Strike, LLC, Cleveland, OH (US)

(72) Inventor: Leonard M. Bashkin, Cleveland, OH (US)

(73) Assignee: 3 STRIKE, LLC, Cleveland, OH (US)

( * ) Notice: Subject to any disclaimer, the term of this patent is extended or adjusted under 35 U.S.C. 154(b) by 382 days.

(21) Appl. No.: 18/171,611

(22) Filed: Feb. 20, 2023

(65) Prior Publication Data

US 2023/0209022 A1 Jun. 29, 2023

Related U.S. Application Data

(63) Continuation-in-part of application No. 17/162,414, filed on Jan. 29, 2021, now Pat. No. 11,589,015, which is a continuation of application No. 16/577,213, filed on Sep. 20, 2019, now Pat. No. 10,939,077, which is a continuation of application No. 15/276,239, filed on Sep. 26, 2016, now Pat. No. 10,455,200.

(51) Int. Cl.
| | |
|---|---|
| *H04N 7/18* | (2006.01) |
| *B65D 50/00* | (2006.01) |
| *G06Q 10/087* | (2023.01) |
| *G06V 20/59* | (2022.01) |
| *G06V 40/16* | (2022.01) |
| *G07C 9/00* | (2020.01) |

(52) U.S. Cl.
CPC .......... *H04N 7/188* (2013.01); *G06Q 10/087* (2013.01); *G06V 20/59* (2022.01); *G06V 40/172* (2022.01); *G07C 9/00563* (2013.01); *G07C 9/00896* (2013.01); *B65D 50/00* (2013.01)

(58) Field of Classification Search
CPC ...... H04N 7/188; G06Q 10/087; G06V 20/59; G06V 40/172; G06V 20/52; G07C 9/00563; G07C 9/00896; B65D 50/00
See application file for complete search history.

(56) References Cited

U.S. PATENT DOCUMENTS

| | | |
|---|---|---|
| 5,379,564 A | 1/1995 | Wynne |
| 7,492,255 B1 | 2/2009 | Morris |
| 8,570,169 B2 | 10/2013 | Green et al. |
| 8,686,831 B2 | 4/2014 | Green et al. |
| 9,123,224 B2 | 9/2015 | Hall et al. |
| 2002/0177922 A1 | 11/2002 | Bloom |
| 2004/0041705 A1 | 3/2004 | Auerbach et al. |
| 2008/0174432 A1* | 7/2008 | Ulrich .................. G06K 7/0008 340/572.1 |

(Continued)

FOREIGN PATENT DOCUMENTS

WO 2012101598 A2 8/2012

*Primary Examiner* — A. Hunter Wilder
(74) *Attorney, Agent, or Firm* — Tucker Ellis LLP

(57) ABSTRACT

Systems and methods of the invention relate to managing an inventory of items within a storage container. A storage container can house one or more items for distribution among one or more users such as, for instance, employees. The storage container discussed herein provides authentication of a user, tracking of the inventory each user removes or returns, video/image capture of user during access of the storage container, wireless tracking of items housed within the storage container, among others.

12 Claims, 16 Drawing Sheets

(56) References Cited

U.S. PATENT DOCUMENTS

| | | | |
|---|---|---|---|
| 2009/0213221 A1 | 8/2009 | Kanda | |
| 2011/0140887 A1* | 6/2011 | Pudney | G06Q 10/08 |
| | | | 52/173.1 |
| 2011/0178630 A1* | 7/2011 | Green | G07C 9/00896 |
| | | | 700/214 |
| 2014/0297487 A1* | 10/2014 | Bashkin | H04N 23/90 |
| | | | 705/28 |
| 2015/0254603 A1* | 9/2015 | Bashkin | G06V 40/70 |
| | | | 312/237 |
| 2024/0013146 A1* | 1/2024 | Thomas | G06Q 10/087 |

\* cited by examiner

STORAGE ROOM WITH INVENTORY CONTROL

CROSS-REFERENCE TO RELATED APPLICATIONS

This application is a continuation-in-part application of U.S. Non-provisional application Ser. No. 17/162,414, filed on Jan. 29, 2021, and entitled "STORAGE ROOM WITH INVENTORY CONTROL", which is a continuation application and claims the benefit of U.S. Non-provisional application Ser. No. 16/577,213, filed on Sep. 20, 2019, and entitled "STORAGE CONTAINER WITH INVENTORY CONTROL", which is a continuation application and claims the benefit of U.S. Non-provisional application Ser. No. 15/276,239, filed on Sep. 26, 2016, and entitled "STORAGE CONTAINER WITH INVENTORY CONTROL." The entireties of the aforementioned applications are incorporated herein by reference.

BACKGROUND

Technical Field

Embodiments of the subject matter disclosed herein relate generally to systems and methods for inventory management in an environment, and more specifically, relate to a powered storage container for managing inventory items and providing for the inventory's ease of replenishment.

DISCUSSION OF ART

A variety of professional and other environments rely on a diverse assortment of inventory. From pens and pencils, which may be stocked in the hundreds, to expensive or specialized electronic equipment shared between a group of workers, it is important for organizations or even individuals to track and evaluate supplies or equipment. Traditionally, supplies are kept in open areas, where anyone may remove or utilize them, or secured areas, which require a specific person to control access. In open areas, easy access to supplies may encourage their misuse or loss, increasing costs and the burden of managing supplies. In secure areas, key personnel who frequently access inventory may be inconvenienced, inventory may not be immediately available as-needed, and additional personnel is required to control access. An alternative arrangement can be for individuals to seek their own supply, which is less efficient than ordering in bulk for a group, and either encumbers individuals with the expense of furnishing their respective inventory items at retail cost or creates additional paperwork and effort for reimbursement.

Existing technologies attempting to automate such management are complex and expensive. They typically rely on expensive or custom hardware and software, are error-prone, and are frequently limited to specific areas and difficult to move. Further, existing systems do not positively identify each user, which limits the resolution of inventory management data and increases the likelihood of misuse or abuse by individuals. In addition, existing systems are complex and cumbersome, and as a result access to inventory is tedious, frustrating, and wasteful.

Accordingly, it may be desirable to have systems or methods for managing an inventory that differs from those systems and methods that are currently available, for example, to reduce cost, improve ease of use, affirmatively identify users interacting with inventory, increase system flexibility after deployment, and decrease the time required to access, remove, or replenish inventory properly. Such examples are non-exhaustive and non-limiting, and the systems and methods described herein will include other benefits and possess other motivations than those expressly listed.

BRIEF DESCRIPTION

In an embodiment, a system is provided that includes a storage container that houses a first item and a second item, wherein the first item includes a first amount and a second item includes a second amount and the first item and the second item are non-medical related. In the embodiment, the inventory system can further include a verification component that is configured to receive a portion of data from a user and a lock mechanism for the storage container that secures an access thereto based upon the portion of data from the user. The inventory system further includes a camera system that provides a first camera focused on the user and a second camera focused on at least one of the first item or the second item. In an embodiment, the system can include at least four (4) cameras in which one camera is positioned and focused on the user accessing the storage container and the three (3) cameras are focused on sections of the storage container that includes items (e.g., on each shelf, among others), and all user motions around those items.

In the embodiment, the inventory system can include a controller component that is configured to record media from the first camera and the second camera upon verification of the portion of data from the user and a wireless scanning device that provides a scan of a portion of the first item or a portion of the second item to indicate a removal from the storage container. The controller component monitors at least one of the first amount of the first item or the second amount of the second item based on at least one of the scans or recorded media and the controller component stores at least one of the portion of data, the scan, or the recorded media.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
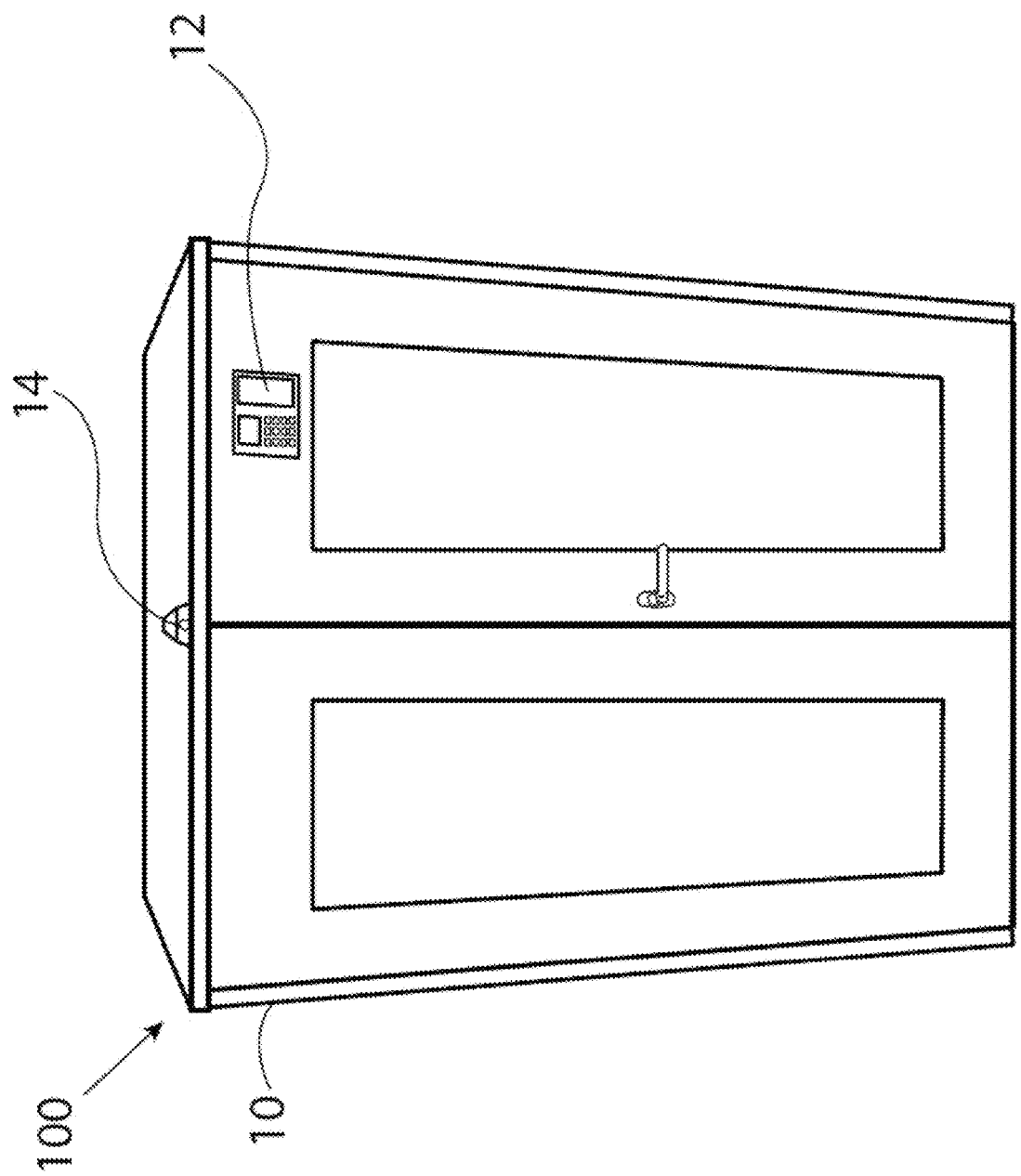
FIG. 1 is an illustration of an embodiment of a system for managing an inventory of items for an environment.

Embodiments of the invention relate to methods and systems for managing an inventory of items within a storage container, wherein the inventory of items are non-medical related. A storage container can house one or more items for distribution among one or more users (e.g., employees, members, students, volunteers, contractors, and others). The storage container discussed herein provides authentication of a user, tracking of inventory that each user removes or returns, video/image capture of user during access of the storage container, wireless tracking of items housed within the storage container, among others. The storage container can provide management of items within an environment by tracking each user and items consumed, used, removed, and/or returned. In addition, the storage container and/or interfaces associated therewith can enable users (e.g., administrators) to add or remove items of the environment from the container to effect detailed, accurate tracking of particular items and dynamically manage inventory control efforts.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "component" can further include a controller programmed to perform a function, step, or methodology as described herein.

The term "storage container" or "container" as used herein can be defined as a mechanical device that defines a volume, at least partially surrounded by the device, wherein the volume can house one or more items. In particular, the storage container or container can include an opening that allows a user to retrieve one or more items housed therein. Moreover, the storage container can house the items and such storage container may be secured/unsecured, open/closed, locked/unlocked, et cetera, thereafter.

As used herein, an "inventory" can be one or more items capable of being at least partially controlled by systems or methods disclosed herein. While the concept of "inventory" lends itself to boxes of pens or sheets of paper, it will be understood on review of the disclosures herein that an inventory can be a single item (e.g., a computer, a piece of scientific equipment, a camera, sensitive print information, a piece of manufacturing equipment), a plurality of items (e.g., paperclips, batteries, manufacturing components, repair parts), and/or combinations thereof. In embodiments, only a portion or related aspect of an inventory is stored in a container described herein. For example, one set of items controlled by a container herein can be keys for one or more vehicles. Thus, a vehicle inventory can be managed by aspects herein, although the vehicles themselves are not stored in the container. In another embodiment, a large piece of equipment can be partially secured using devices in here, and cannot be used or moved without unlocking, despite the fact that physical contact with at least a portion of the equipment is possible before it is released by the container. These aspects are provided for illustrative purposes only, and are not intended to prohibit the use of larger containers (e.g., sufficient to contain an automobile) with aspects herein. For example, a shipping container or secure room can be configured with aspects herein to maintain larger items in its volume. While "inventory" can be used to indicate a collective plural, it may also be used herein to indicate a particular item or items. "Inventory item" or similar terminology can refer to one or more of a specific item within an inventory. Unless specifically indicated otherwise, such language may be used interchangeably in instances.

Further, while aspects herein are generally directed toward a workplace environment and an inventory of supplies or equipment associated with an office, no example given or inference drawn should be deemed to limit application of the techniques herein to a particular environment. The container may be used in a variety of indoor or outdoor settings, and, in embodiments, may be ruggedized or include hermetic seals to withstand environmental conditions or hazards associated with use in a particular environment.

Systems and methods herein can be designed to track internal inventory for customers who currently use earlier vending machines at less than half the cost of existing systems. Low-cost components can be integrated and flexible systems provided to avoid the expense of custom solutions.

Systems and methods herein can further include biometric or other positive user authentication. Video recording adds an additional level of accurate monitoring. By carefully identifying each and every user interacting with an inventory control system, users are motivated to use the system properly and properly manage organizational resources.

Hardware and software used with aspects disclosed herein can additionally be integrated end-to-end through an organization. Network, hardware, and software compatibility between components permits devices to "talk to" one another, as well as communicate with other devices.

Despite the capability of systems and methods herein to interact remotely, aspects herein are configured to function without Internet access. By avoiding a connectivity requirement to use, aspects herein are made more robust and flexible than a system that only functions with Internet access.

Systems and methods herein also dramatically increase the speed and efficiency of inventory access and management from the user perspective.

Authentication, opening, removal, and closing of inventory management systems herein can take less than 15 seconds, whereas existing solutions often require dramatically more time to utilize.

Figure 2:
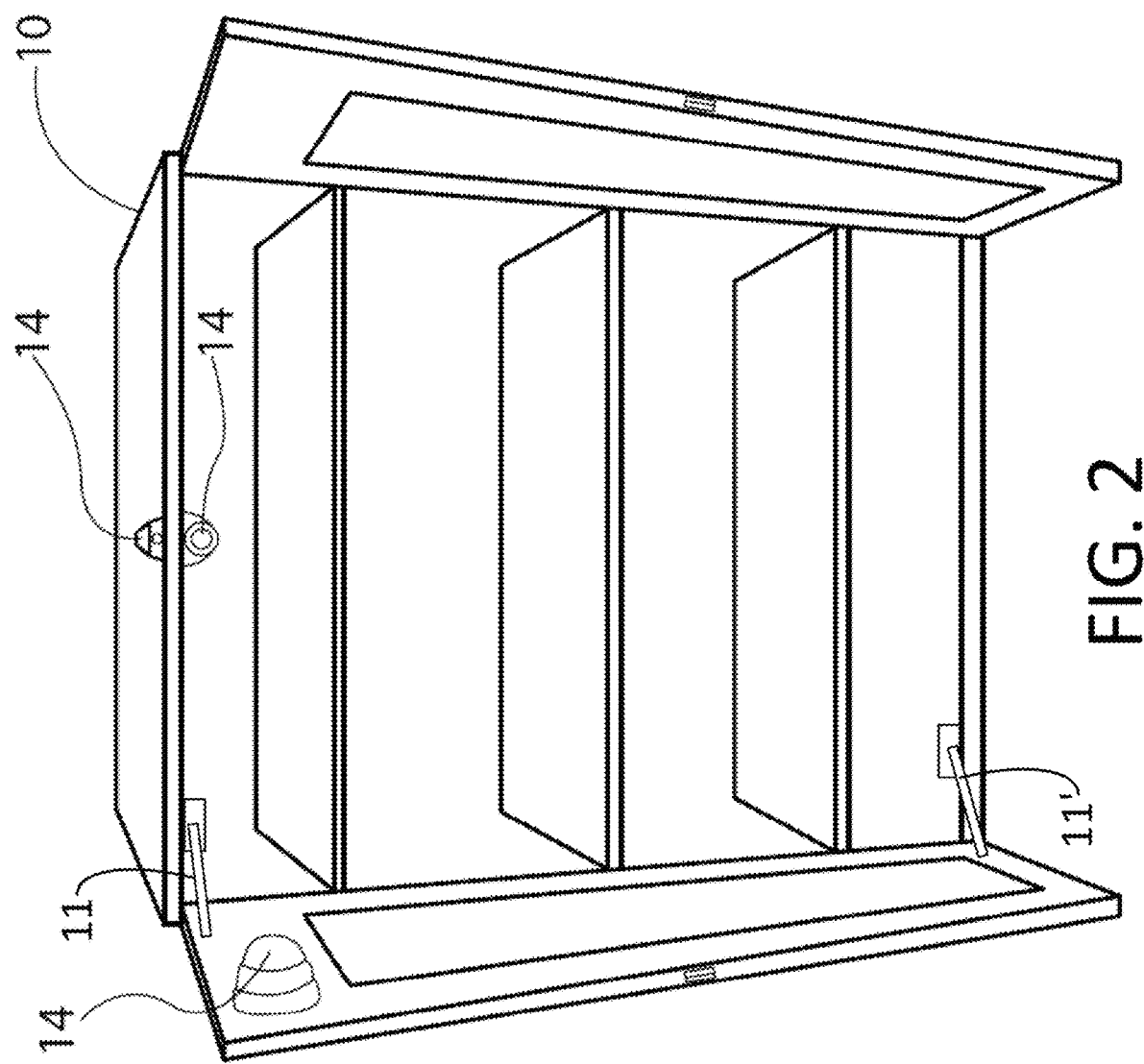
FIG. 2 is an illustration of an embodiment of a system for managing an inventory of items for an environment.
Figure 3:
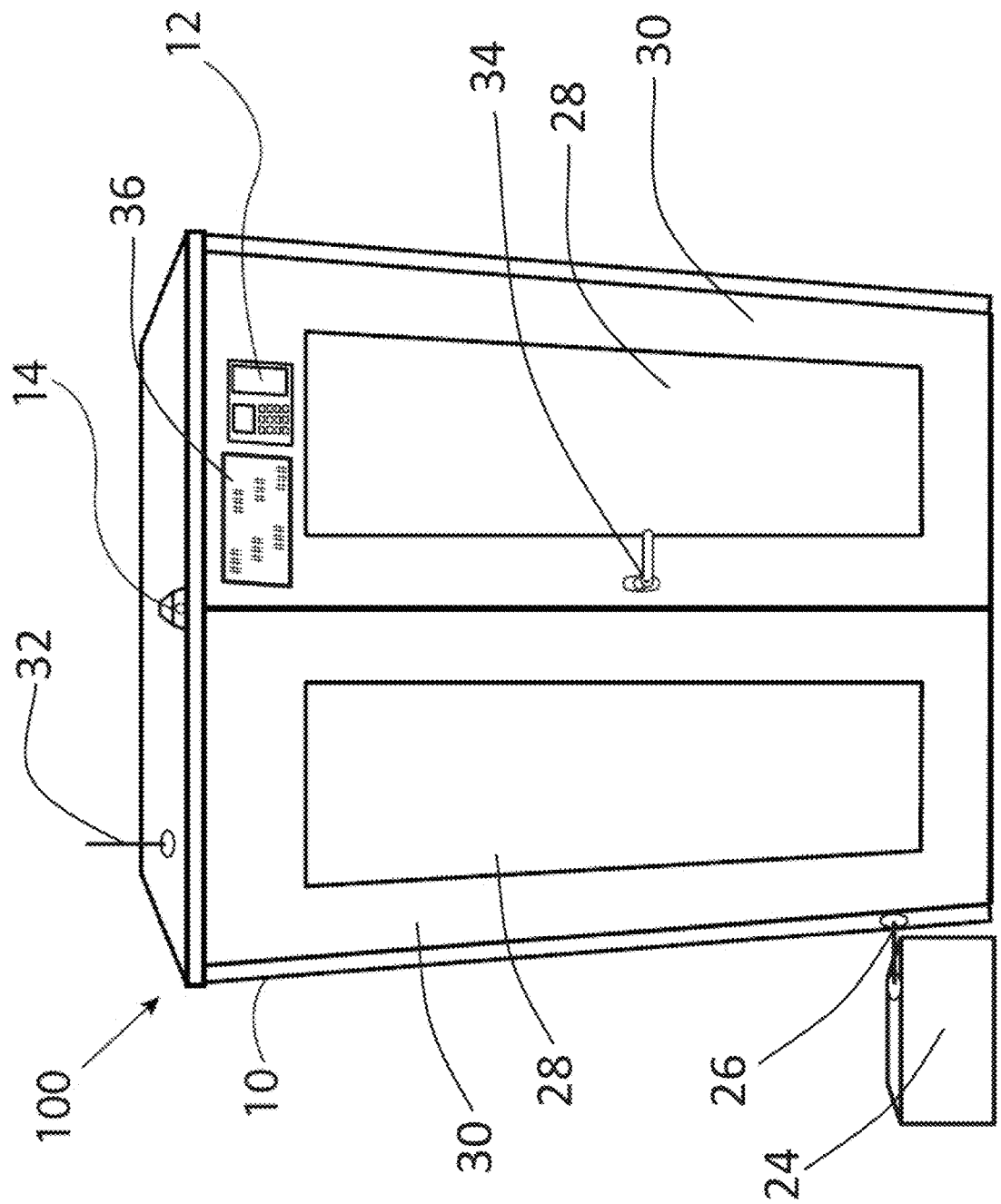
FIG. 3 is an illustration of an embodiment of a system for managing an inventory of items for an environment.

FIG. 1 is an illustration of a system 100 (also referred to as an inventory system) for managing items housed within a storage container 10. FIGS. 1-3 illustrate the storage container 10 and various embodiments of the system 100. In particular, FIG. 1 illustrates the storage container 10 in a closed state (e.g., no access to the internal housing of items) and FIG. 2 illustrates the storage container 10 in an open state (e.g., access to the internal housing of items). The storage container 10 houses one or more items. It is to be appreciated that the items can be any suitable item or good that is used within an environment. For instance, in an office work environment, the item can be an office supply such as, but not limited to, a pen, a ruler, tape, compact disks, DVD's, among others. In another example, the environment can be an industrial work environment, wherein the item can be a tool, a pair of gloves, safety goggles, among others. It is to be appreciated that the subject innovation is intended to include any suitable item that is to be managed and/or tracked to optimize consumption of such item. The storage container 10 can be placed in any suitable location such as personal property or land, ships, drilling rigs, vehicles, hospitals, schools, retail stores, construction sites, mines, among others.

The storage container 10 further includes a verification component 12. The verification component 12 is configured to receive a portion of data from a user as input to determine whether the user is allowed access to the storage container and/or inside of the storage container 10 that houses items. In an example, the system 100 can utilize a lookup data table that includes corresponding portions of data for each registered user that has access to the storage container 10. Thus, if a portion of data is received by the verification component 12 and is contained within the lookup table (e.g., corresponding to a user based on a prior registration), the user is allowed access. It is to be appreciated that registration for a user can be employed in various manners and registration techniques are intended to be included with this application.

For instance, a user can access the storage container 10 via the verification component 12 that is configured to receive a portion of data from the user. The portion of data can be, but is not limited to, a portion of biometric data, a code, a number, a letter, a barcode, a proximity sensor via wireless data transfer (e.g., Radio Frequency Identification (RFID), Near Field Communication (NFC), wireless communication via a transmitter and a receiver, among others), a keypad entry, an identification badge, a security badge, among others. By way of example, the biometric data can be a handprint, a fingerprint, a retinal scan of an eye, a portion of facial data of the operator, a height of the operator, a weight of the operator, body-shape of the operator, capacitance of operator based on body-mass index, among others. By way of example, the portion of data can further be, but is not limited to, a username, a password, employee identification, image identification, or a combination thereof. For example, the image identification can be a barcode, a Quick Response (QR) code, a portion of a graphic, a logo, a three-dimensional (3D) barcode, among others.

Embodiments herein can utilize a multi-factor authentication employing two or more verification techniques to access one or more portions of container 10. For example, entered data, biometric data, and other information can be evaluated in combination to complete verification.

Upon verification, the user can be allowed access to the storage container. In a particular example, a lock mechanism 18 is released or engaged based upon whether or not a user is authorized or verified. For instance, a lock mechanism 18 can be a magnetic based lock that is released upon verification of a user to allow access to the storage container. Lock mechanism 18 can be an electronic lock, or a lock with mechanical components that are controlled by associated electronic components. For example, a user is verified by the verification component 12 prior as having access to inside the storage container 10 by, for instance, a thumbprint. Once verified, the storage container 10 allows access to the housed items by releasing or disengaging the lock mechanism 18. As discussed in more detail below, the verification can also activate one or more cameras 14 (also referred to as camera system and/or first camera, second camera, and the like).

The system 100 can further include a first camera focused on the user when opening or accessing the items and a second camera focused on the items housed within the storage container 10. The system 100 can include a controller component 15 that is configured to initiate recording or data collection from the cameras 14 based upon at least one of a verification of the user via the verification component 12 or an unlocking of the lock mechanism 18 based upon approval of the user. In another example, the controller component 15 can initiate recording or data collection based on motion sensing. It is to be appreciated that the controller component 15 can manage the lock mechanism 18 based on the verification component 12, (e.g., access to the storage container 10) as well as, management of tracking items removed or returned to the storage container 10.

In a particular embodiment, the inventory system 100 can include a storage container 10 with shelves at a top position, a middle position, and a lower position respectively. While the illustrated embodiment shows three shelves, any number of shelves can be included. Each shelf can include at least one corresponding camera to capture the area with image or video, in addition to the camera capturing media of the user. Thus, the user is monitored during the interaction with the storage container 10 to identify any removal or return of items to or from the storage container 10. The cameras 14 can collect media (e.g., images, video, and the like) to capture the user and the items as the items are returned or removed from the storage container 10. It is to be appreciated that any suitable number of shelves and/or cameras can be employed with the subject innovation.

In an embodiment, the cameras 14 can be installed inside the storage container 10 such that at least one camera is focused on the user accessing the storage container 10 and one or more cameras are focused on items within the storage container 10 (to track removal or returning). Additionally, the cameras 14 can be remotely controlled to move focus and/or aim to a different location.

In another embodiment, the cameras 14 can be attached to one or more doors (e.g., on the inside of the doors) of the storage container 10, wherein the doors can be limited with motion as to ensure the cameras 14 are focused on at least one of the items in the storage container 10 and/or the user opening or accessing the storage container 10.

The system 100 can further include a scanner 16 (e.g., wireless or hard-wired, also referred to as a scanning device) which is contained or placed within the storage container 10. A user, upon verification and access to the storage container 10 via verification component 12, can utilize the scanner 16 to indicate which items are removed or returned. For instance, a scanning of a first item can indicate the item is being removed and a second scan of the same item can indicate the item is being returned. It is to be appreciated that each item can include a marking component as an identifier to allow tracking of the quantity of each item housed within the storage container. In another embodiment, a device (discussed below) can be used to track removal or return of an item.

In another embodiment, the system 100 can utilize a scale system 46 that is configured to measure a weight of one or more items housed within the storage container 10 and determine whether the number of items changed based on a change in weight. For instance, a number of items can have a first weight and when one or more items are removed or returned, a new weight is detected by a scale system 46 to determine a number of items. This can be utilized in combination or in the alternative of one or more cameras to detect item removal or return.

The scale system 46 can use one or more algorithms to determine the addition or removal of items. For example, upon impulse, the scale system 46 may pause for the weight detected to remain within a threshold (e.g., not varying by more than ten (10) grams) for a preset time (e.g., for three (3) seconds) before an inventory removed or added is calculated. In embodiments, one or more inventory items can be tracked by weight. Various tolerances and thresholds can be employed to accurately track inventory without permitting fraud or abuse. Further, as discussed elsewhere herein, weight can function as one of a multi-factor test to confirm proper inventory tracking. Inventory tracking, including multi-factor inventory tracking, need not deal exclusively with the removal of inventory, but can also confirm or verify return, replacement, or complete use or exhaustion of previously accessed inventory.

The system 100 can further include and/or work in conjunction with a wireless tracking system (not shown) such as, but not limited to, RFID, NFC, or a suitable transmitter and receiver system on each item. The wireless tracking system can be used to track each item and quantities of items housed within the storage container 10. In another example, the cameras 14 can track movement to determine whether or not an item is removed or replaced/returned. Based on the tracked movements, the controller component 15 can manage an inventory within the storage container 10.

In an embodiment, the controller component 15 monitors an amount of the items based on at least one of the scanner 16 and/or recorded media from cameras 14. Additionally, the controller component 15 stores at least one of the portion of data, the scan, the recorded media, and/or any other suitable data from the system 100 to a data store.

It is to be appreciated that the detail of tracking inventory items from the storage container 10 can be any suitable level based on use of the scanner 16, scale system 46, motion sensors, among others. The described storage container 10 can be employed with one or more of the described features in order to tailor to a particular environment. For instance, the system can be employed with cameras when the environment or management of the environment is not concerned with tracking each amount of each item stored in the storage container 10 (e.g., user behavior is influenced by awareness of being recorded). In another embodiment, a camera tracking system can include the scanner 16 as well. In another example, the scale system 46 can be used in combination or in the alternative of the scanner 16. For instance, an environment that includes items that are difficult to track due to size (e.g., small in size) can leverage cameras 14, as well as, the a scale system 46 rather than the scanner 16 (e.g., scanning small items can be difficult due to size).

As alluded, a variety of techniques can be employed to track inventory within the system 100. In order to more accurately track inventory present, added, or removed, inventory can be marked in one or more ways facilitating accurate identification. Accurate identification can include a multi-factor test applied based on activity related to the container 10 (e.g., weight on scale reduced or increased, motion sensed, and others). For example, a blue pen can be accidentally replaced or bumped into the area designated for red pens. In this example, the weight of each red pen and blue pen is similar and a motion detection may be used to accurately track the inventor for the red pens and blue pens. Moreover, the total weight of all the items in a designated area can be detected as well as the total weight of all items in an area surrounding or proximate so as to detect any changes in weight that are based on an item being placed in an area not designate for that item.

will result in an inaccurate inventory for both the red pens and the blue pens or pencils. Such activity may thwart highly accurate inventory management.

In an embodiment, the system 100 can utilize a marking component (not shown) as an identifier. Marking can include any combination of stickers, tags, bands, and other attachments or treatments. Such marking can relate to color coding, defining reflective portions, defining portions having a known infrared signature, including different patterns, including magnetic portions, and so forth. Various machine vision techniques can be employed alone or in combination with scanners (e.g., scanner 16) or sensors (e.g., detectors used in combination with RFID technology, magnets, light intensity, and so forth) to accurately identify specific inventory items.

Additional means for identifying the removal or replacement of particular items can include inventory holder 48. Inventory holder 48 can be a standalone device or integrated into one or more portions of container 10. Inventory holder 48 can include one or more mechanical or electrical means to detect the presence or absence of an item. For example, inventory holder 48 can retain a plurality of thumb drives. Based on whether a thumb drive is present, a mechanical closure may be held open, or an electrical circuit may be held open, such that removal of the thumb drive closes the apparatus or circuit, triggering a signal to indicate the thumb drive was removed. In embodiments, inventory holder 48 can be specially sized or configured to accept a specific inventory item. In alternative or complementary embodiments, inventory holder 48 can be adapted to accept a plurality of different items simultaneously or at different times.

The system 100 can include a first power source 22 and a backup power source 24 to provide power thereto. For instance, a first power source 22 can provide power to the system 100 from a main line of power, wherein a backup power source 24 can provide power as a backup system in the event power is unobtainable via the main line of power. For instance, the backup power source 24 can be, but is not limited to, a battery power source. In an embodiment, one or more of first power source 22 and/or backup power source 24 can provide surge protection to prevent damage or outages. In an embodiment, the backup power source 24 can operate as the power supply for continued extended use in the event the primary power supply (e.g., wired AC power) is interrupted in the environment around the storage container 10 (e.g., a property where storage container 10 is deployed may experience a property-wide power outage, but backup power source 24 prevents impact on operational capability of storage container 10 and/or components thereof).

Backup power source 24 also allows system 100 to be moved without interruption (e.g., powering down) of one or more electrically powered components. First power source 22 can be a primary (e.g., wired AC power) cord, and this cord may be disconnected (e.g., from a wall plug). Backup power source 24 can keep system 100 energized until first power source 22 is reconnected. First power source 22 can be reconnected in a different location after moving system 100.

In embodiments, backup power source 24 can be, at least in part, outside container 10. In alternative embodiments, backup power source 24 can be stored within container 10 (not pictured). In still additional alternative or complementary embodiments, backup power source 24 can include multiple components or sources, some of which are stored in container 10, and some of which exist outside container 10. Power cable 26 can link backup power source 24 to the power line through which first power source 22 or another power supply energizes the components of system 100.

The system 100 can further include a notification component 20 that is configured to communicate a notification or signal. The notification component can generate at least one of an audible signal, a visible signal, a haptic signal, a wireless signal to another component or device, an email notification, among others. The notification component 20 can be customized to transmit or display a signal based upon at least one of a repair needed, a maintenance needed, a duration of time lapsed, a replenishment of inventory needed, a theft, an unauthorized access, a detected tampering (e.g., shaking, force detected, among others), and the like. For instance, upon an item being below defined quantity, a signal can be communicated to replenish such item. Each time a signal is communicated or displayed from notification component 20, it can be logged into a data store.

System 100 can include a communications component 54. Communications component 54 can facilitate one or more techniques of wired or wireless data communication to transfer information for storage or analysis, transmit notifications, facilitate remote access, et cetera. In embodiments, communications component 54 can be enclosed within container 10. In alternative or complementary embodiments, communications component 54 exists, at least partially, outside container 10. In another example, communications component 54 can be substantially housed in container 10, but include an external link, such as antenna 32, external wiring, or other techniques.

The system 100 can further include a remote access to at least one of the storage container 10, the lock mechanism 18, the verification component 12, the cameras 14, the controller component 15, the scanner 16, the power source 22, the backup power source 24, the notification component 20, the communications component 54 or a combination thereof. The remote access allows control of the system 100 from a location other than the storage container 10. For instance, a remote access can allow control of the storage container 10 from a computer in a different physical location in comparison to the location of the storage container 10. In another embodiment, a remote access can be from one network to a second network hosting the storage container 10. It is to be appreciated that the network can be any suitable network such as, but not limited to, a wireless network, LAN, WAN, Ethernet, Wi-Fi, local, remote, cloud-based, or a combination thereof. The remote access can be utilized to manage video capture or media capture, access to the storage container 10, turn on or off components, unlock or lock the storage container 10, move or adjust cameras 14, access the scanner 16, communicate a signal from the notification component 20, among others. In another example, a remote access can be utilized to provide trouble-shooting (including, e.g. off-site trouble-shooting) to the system 100.

The system 100 can further be utilized to analyze usage, patterns, or purchases of items based on the data collected related to items removed, returned, used, consumed, among others. For instance, a number of items in the storage container can be determined to have a particular lifetime or last a specific amount of time based on historical data. Additionally, historical data can be used to determine a user that is consuming or using too much of an item. It is to be appreciated that inventory data collected can be used in various applications and is intended to be included with the subject innovation. In an embodiment, the controller component 15 is configured to provide an estimation of consumption for a plurality of items (e.g., the first item or the second item) based upon collected historical data related to removal of items from the storage container.

In an example, a user can interact with the storage container 10 with a device, wherein the interaction can be a verification (e.g., via verification component 12) or a logging of items (e.g., using a device, such as a scanner 16). It is to be appreciated that the device can be, but is not limited to being, a computer, a desktop machine, a tablet, a portable device, a portable digital assistant, a smartphone, a laptop, a computing device, a portable gaming device, a game console, a device that can access the Internet, a kiosk, a terminal, a display, a surface computing device, smart glass, a surface that interacts with a user's motion or touch, and the like.

Figure 5:
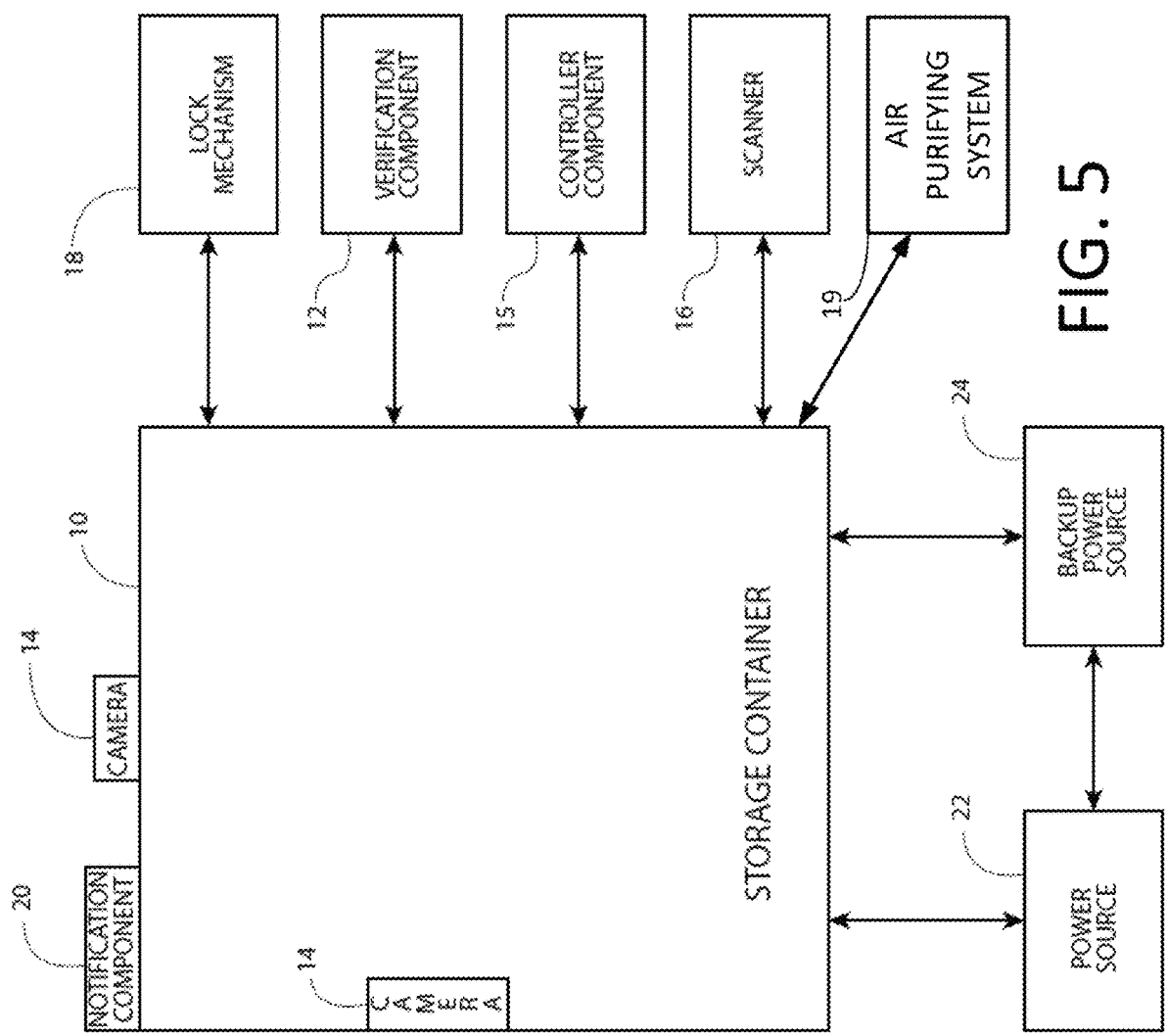
FIG. 5 is an illustration of a block diagram of a system for managing an inventory of items for an environment.

Although not depicted in FIG. 1, it is to be appreciated that, in an embodiment, the controller component 15 can be a stand-alone component (as depicted in FIG. 5), incorporated into the storage container 10, or a suitable combination thereof. Similarly, it is to be appreciated that, in an embodiment, the verification component 12 can be a stand-alone component (as depicted FIG. 5), incorporated into the storage container 10, or a suitable combination thereof. Similarly, it is to be appreciated that, in an embodiment, the lock mechanism 18 can be a stand-alone component (as depicted in FIG. 5), incorporated into the storage container 10, or a suitable combination thereof. Similarly, it is to be appreciated that, in an embodiment, the camera(s) 14 can be a stand-alone component (as depicted in FIG. 5), incorporated into the storage container 10, or a suitable combination thereof. Similarly, it is to be appreciated that, in an embodiment, the power source 22 and/or backup power source 24 can be stand-alone components (as depicted), incorporated into the storage container 10, or a suitable combination thereof. Similarly, it is to be appreciated that, in an embodiment, the notification component 20 can be a stand-alone component (as depicted in FIG. 5), incorporated into the storage container 10, or a suitable combination thereof. In various embodiments, other components (e.g., scanner 16, scale system 46, inventory holder 48, power cable 26, communication component 54) can be stand-alone components, incorporated into storage container 10, or combinations thereof.

The system 100 can store media from cameras, portions of data from users, registration data, inventory information, item data, among others in a data store. It is to be appreciated that the data store can be, for example, either volatile memory or nonvolatile memory, or can include both volatile and nonvolatile memory. The data store of the subject systems and methods is intended to comprise, without being limited to, these and other suitable types of memory. In addition, it is to be appreciated that the data store can be a server, a database, a hard drive, a flash drive, an external hard drive, a portable hard drive, a cloud-based storage, a solid-state drive, and the like. The data store can further be a local data store, a remote data store, a cloud-based data store, or a combination thereof.

Specifically shown in FIG. 3, system 100 can include display component 36 mounted to container 10. Display component 36 can display any information, including information related to container 10, its inventory, users, and other containers. In embodiments, display component 36 can display the inventory contained in summary or item-by-item. In some embodiments, display component 36 can display a status of container 10 related to its function (e.g., offline or requiring service) or its inventory (e.g., items checked out or exhausted). In the event that container 10 requires service (e.g., damaged, inventory requiring replenishment), display component 36 can display the location of nearby containers with one or more desired inventory items. Display component 36 can be couple with one or more other components (e.g., processors, memory) to receive data related to the information presented on display component 36.

In alternative or complementary embodiments, display component 36 can display information about an inventory item, user, or group of users. For example, inventory information can include information about an inventory item, its cost, its expected lifespan or usage, and others. In embodiments, a user's inventory usage can be displayed, such as the number or value of items utilized. In embodiments, display component 36 can facilitate an account system where credits or debits are tracked by user. In particular embodiments, the user can be given an inventory "allowance" where they will be prevented from accessing additional inventory items after debits exceed a threshold. Finally, users or groups of users can be displayed on display component 36 in terms of their total usage or efficiency, or comparative usage or efficiency in view of other users or groups.

Container 10 can include panels 28. In embodiments, panels 28 can be transparent or opaque. In such embodiments, panels 28 can enable viewing of at least a subset of inventory items in container 10. In alternative embodiments, one or both of panels 28 are solid, preventing view into container 10.

Closure 34 can be used to manually actuate opening or closing of container 10 once verification is complete via verification component 12.

Figure 4:
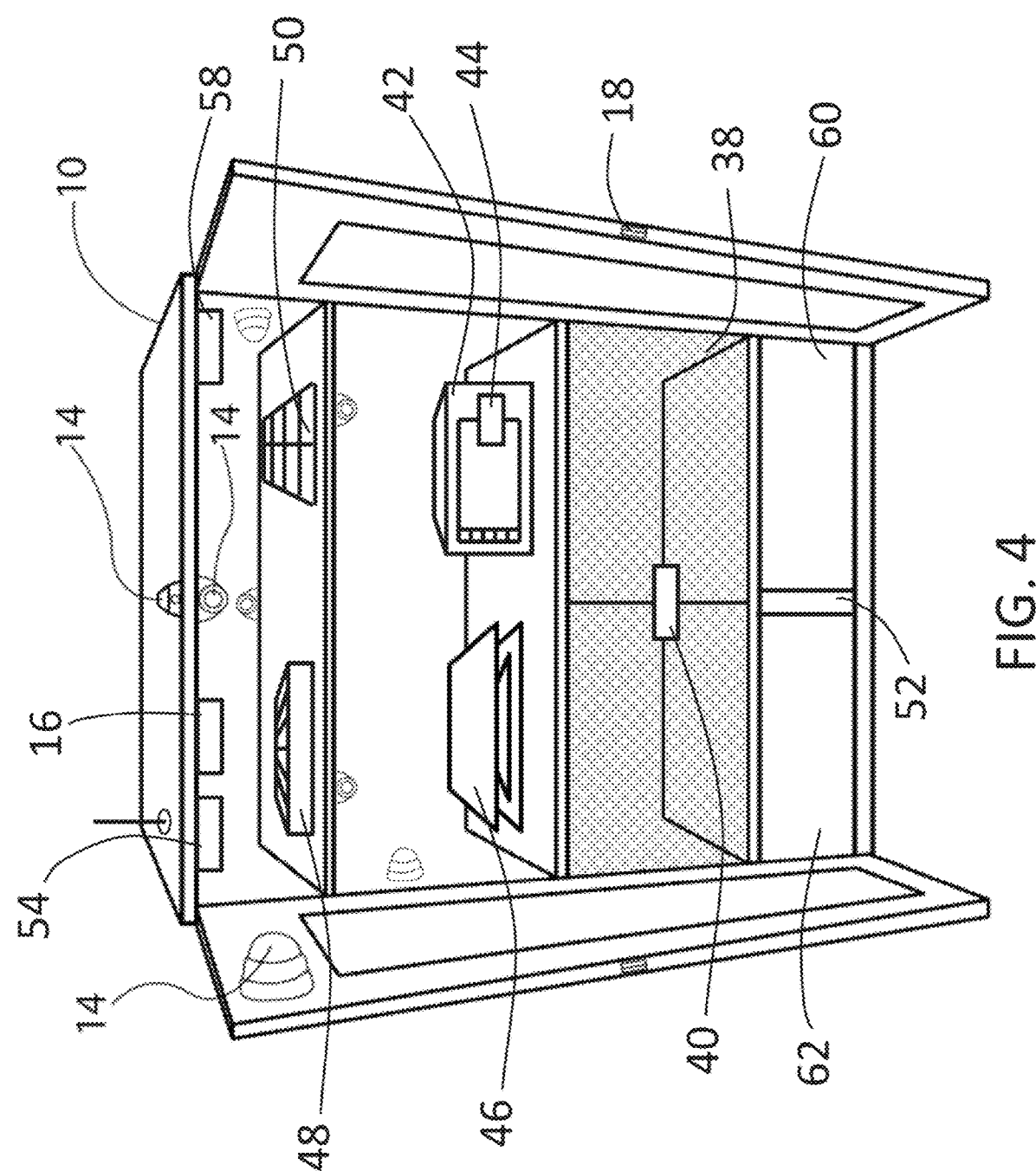
FIG. 4 is an illustration of an embodiment of a system for managing an inventory of items for an environment.

With specific reference to FIG. 4, other aspects are depicted. As shown, a plurality of cameras and motion sensors can be included without regard for their type, position, or arrangement. Container 10 may include motor component 58, which can automatically open or close one or more security features of container 10. For example, motor component 58 can open one or both doors based on a verification. Motor component 58 can be used alone or in combination with one or more camera(s) 14 (or other sensors). For example, when used with camera(s) 14, logic employing imagery from camera(s) 14 (or other sensors) can be used to prevent harm to users or damage to inventory based on opening or closing of container 10.

Container 10 may include vending component 50. Vending component 50 may, upon proper verification via verification component 12 (or other components), dispense one or more inventory items to a manual retrieval. Vending component 50 may be integrated into container 10, or may be a standalone device placed therein. For instance, the vending component 50 can automatically release an item stored in the container 10 based upon verification, authentication, and the like. For instance, the vending component 50 can include multiple items with each item secured, wherein upon authentication or verification, one of the multiple items can be automatically dispensed to a user. It is to be appreciated that the automatic dispensing of the item from the container 10 can include at least unlocking, unsecuring, releasing, delivering, or providing the item to the user.

Container 10 may include one or more security sector components 38. Security sector 38 is secured by sector locking component 40. Based on verification via verification component 12 (or other components, including manual locks), security sector 38 may be unsecured to access contents. In this regard, security sector 38 can store specific inventory items whereby a user who does not have verification credentials to access security sector 38 can still access the remainder of container 10.

Container 10 may also include security box 42 having a box locking component 44. Like sector locking component 40, box locking component 44 can be secured or unsecured based on one or both of verification information from verification component 12 or other mechanisms. Box component can be fixed or movable within container 10, and deny at least a portion of users access to contents of security box 42 while still permitting access to the remainder of container 10.

Container 10 can include single sides 60 and 62 separated by divider 52. Divider 52 prevents a user from accessing single side 60 or 62 when the door or closure covering this side is secured. For example, a verification via verification component 12 can unsecure one door or half of container 10, allowing a user to access only the permitted portions of container 10. By separating single sides 60 and 62, divider 52 denies users lacking adequate verification level from accessing one side and the inventory associated therewith.

The aforementioned systems, components, (e.g., storage container 10, camera(s) 14, verification component 12, controller component 15, scanner 16, lock mechanism 18, notification component 20, power source 22, backup power source 24, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, an inventory system 100 is provided with the portion of data being at least one of a biometric data of the user, a barcode, an identification badge, a number, a code, a face detection of the user, a fingerprint of the user, or a wireless communication from the user. In an embodiment, the inventory system 100 further includes a power source 22 that supplies a portion of power to at least one of the wireless scanning device 16, the camera system 14, the controller component 15, or the lock mechanism 18. In an embodiment, the inventory system 100 further includes a backup battery power source 24 that supplies a portion of power upon the interruption of power to the power source 22.

In an embodiment, the inventory system 100 further includes a scale system 46 that measures a weight associated with at least one of the first item or the second item to determine at least one of the first amount or the second amount. In an embodiment, the inventory system 100 further includes a notification component 20 that is configured to communicate a notification based upon at least one of a service call, a maintenance, a repair, or a replenishment of the first item or the second item.

In an embodiment, the inventory system 100 further includes the wireless scanning device providing a scan of a portion of the first item or a portion of the second item to indicate a return to the storage container 10, wherein the controller component 15 is further configured to monitor the return of at least one of the first item or the second item. In an embodiment, the inventory system 100 further includes a camera system 14 that detects movement from the user to determine at least one of a removal or a return of at least one of the first item or the second item.

As described above, a first camera can focus on a user in proximity to inventory system 100. A second camera may focus on at least a first area inside the storage container. In an embodiment, the camera system 14 further includes a third camera and a fourth camera, wherein the third camera focuses on a second area inside the storage container, and the fourth camera focuses on a third area inside the storage container. Additional cameras may be provided to focus on other areas in some embodiments. In an embodiment, the controller component 15 is further configured to provide an estimation of consumption for at least one of the first item or the second item based upon collected historical data related to removal of the first item or the second item from the storage container 10.

In an embodiment, the system 100 can emit a signal in the event the door of storage container 10 remains open (or is improperly closed) for a specified duration of time (e.g., 35 seconds, among others) after being permitted to open (e.g., via verification component 12 and/or lock mechanism 18). For example, container 10 can alert via a signal in the event a user forgets to close or incorrectly closes the door to access container 10. In this example, the alert signal indicates to those in the vicinity of container 10 that the door needs to be closed.

In an embodiment, an inventory management system 100 is provided that includes at least the following: a container 10 with at least one open side; doors 30 including at least a first door that closes a first portion of the open side; a second door that closes a second portion of the open side; a locking component 18 that secures the first door and the second door; a verification component 12 that selectively unsecures and resecures at least one of the first door and the second door based on a verification input, wherein the verification input controls the locking component 18; an inventory tracking component that assesses an inventory quantity within the container; and a controller component 15 that records the inventory quantity to a database.

In the embodiment, the container can include a display component 36 that displays information related to at least one of a user associated with the verification input, the inventory quantity, the inventory management container, or a group of users, wherein the display component 36 is at least one of accessible outside the container or viewable from a user in front of the first door or the second door. In the embodiment, the container 10 can include a first power source 22 and a second power source, wherein at least one of the first power source 22 and the second power source is a battery backup 24. In the embodiment, the at least one of the first power source 22 and the second power source is enclosed within the container 10.

In the embodiment, at least one of the first door and the second door is at least partially transparent (panels 28, or other portions). In the embodiment, the container 10 can include a security sector, wherein the verification component 12 selectively unsecures and resecures the security sector based on the verification input. In the embodiment, the inventory tracking component includes a scale component 46 that ascertains an item within the container 10 based on at least a weight of the item. In the embodiment, the inventory tracking component includes an inventory holder 48 that holds an item within the container 10. In the embodiment, the inventory tracking component includes a vending component 50 that automatically dispenses an item from the container 10 to a user.

In an embodiment, a system is provided that includes at least the following: means for retaining an inventory in an enclosure; means for verifying a user requesting the inventory with a user verification; means for permitting access to the enclosure based on the user verification; means for capturing an image related to the user; means for capturing an image related to the inventory; means for determining removal of the inventory; and means for recording removal of the inventory in a data. It is to be appreciated that an enclosure is a housing that includes a volume. It is to be appreciated that any enclosure or container can be chosen with sound engineering judgment without departing from the intended scope of the subject innovation.

Figure 6:
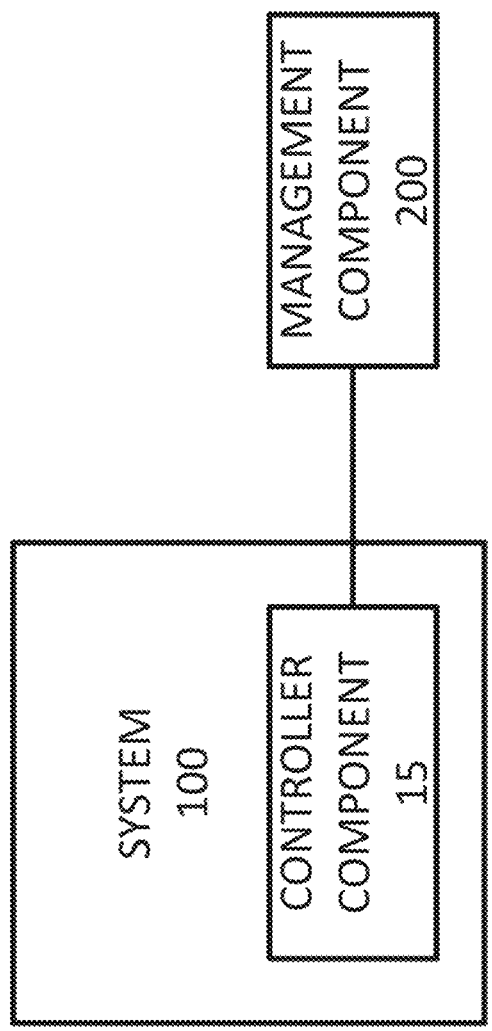
FIG. 6 is an illustration of a block diagram of components used for inventory management.

Turning to FIG. 6, illustrated is an extension of system 100 whereby a management component 200 receives information from (and, in embodiments, transmits information to) controller component 15. Specifically, management component 200 can receive inventory information, location information, user information, group information, and other data that can be used in inventory management. Management component 200 can track and forecast inventory usage, and be used to automate service or replenishment to container 10. Management component 200 can analyze container 10 and inventory utilization for a single container 10 or across an enterprise in multiple locations and with different users and/or functional groups. Management component 200 can identify trends, and flag users, locations or groups which are statistically aberrant in terms of unusually high usage, replenishment requirements, or service. Fraud or theft can be tracked. Coordination between multiple containers (e.g., container 10 and another container) in terms of ordering inventory, replenishment, service, et cetera, can be effected.

Management component 200 can track efficiency or usage by individual user or group, and provide reports related thereto. Further, users may utilize container 10 to request particular inventory not present or submit messages to personnel involved in inventory management, which can be enabled using communication between controller component 15 and management component 200.

Management component 200 can improve enterprise efficiency by reducing inventory replenishment costs. For example, in addition to forecasting and tracking usage within the enterprise, management component 200 can track and forecast pricing from inventory suppliers. Pricing trends, bulk offers, alternative suppliers, coupons, et cetera, can be tracked using network connections, and management component 200 can identify opportune times for the enterprise associated with container 10 to save costs by buying or delaying purchase of inventory. In embodiments, strike conditions can be manually set or inferred by management component 200, and purchasing can be automated using management component 200. Ultimately, resource planning related to at least the inventory stored in container 10 and associated devices can be effected using management component 200.

Figure 7:
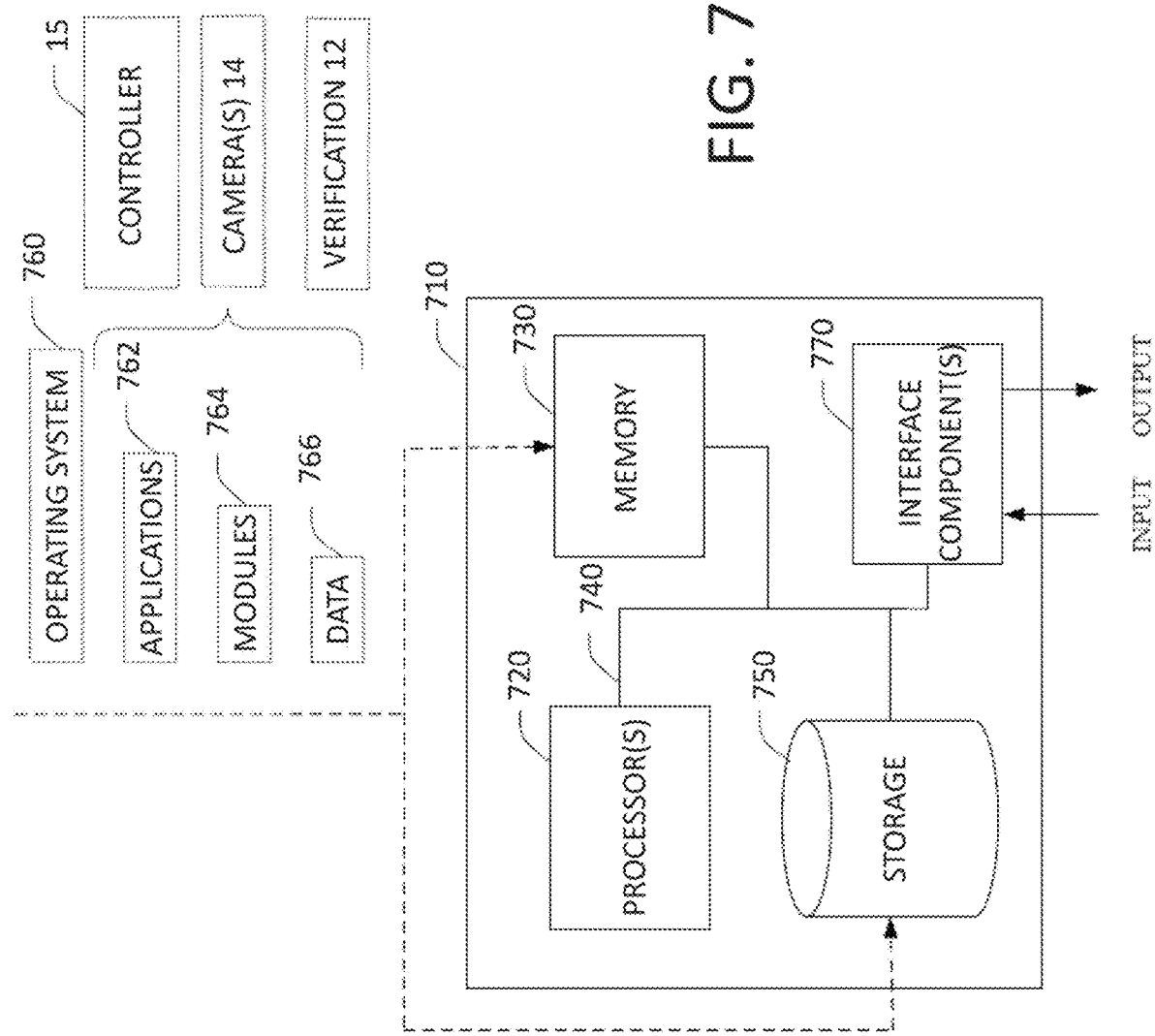
FIG. 7 is an illustration of a block diagram of a computing environment for use herewith.

With reference to FIG. 7, illustrated is an example general-purpose computer 710 or computing device (e.g., desktop, laptop, server, hand-held, programmable consumer or industrial electronics, set-top box, game system, et cetera). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM), et cetera), magnetic storage devices (e.g., hard disk, floppy disk, cassettes, tape . . . ), optical disks (e.g., compact disk (CD), digital versatile disk (DVD), et cetera), and solid state devices (e.g., solid state drive (SSD), flash memory drive (e.g., card, stick, key drive, et cetera), et cetera), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, controller component 15, cameras 14, verification component 12, other components or aspects herein, or portions thereof, can be, or form part of, an application 762, and include one or more program modules 764 and data 766 stored in memory 730 and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors, as well as, memory at least similar to processor(s) 720 and memory 730, among other things. Conventional processors include a minimal amount of hardware and software and rely extensively on external hardware and software. By contrast, a SOC implementation of processor is more powerful, as it embeds hardware and software therein, that enables particular functionality with minimal or no reliance on external hardware and software. For example, the controller component 15, the cameras 14, verification component 12, and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g; serial, parallel, PCMCIA, USB, FireWire, et cetera) or an interface card (e.g., sound, video, et cetera) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer, et cetera). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

Figure 8:
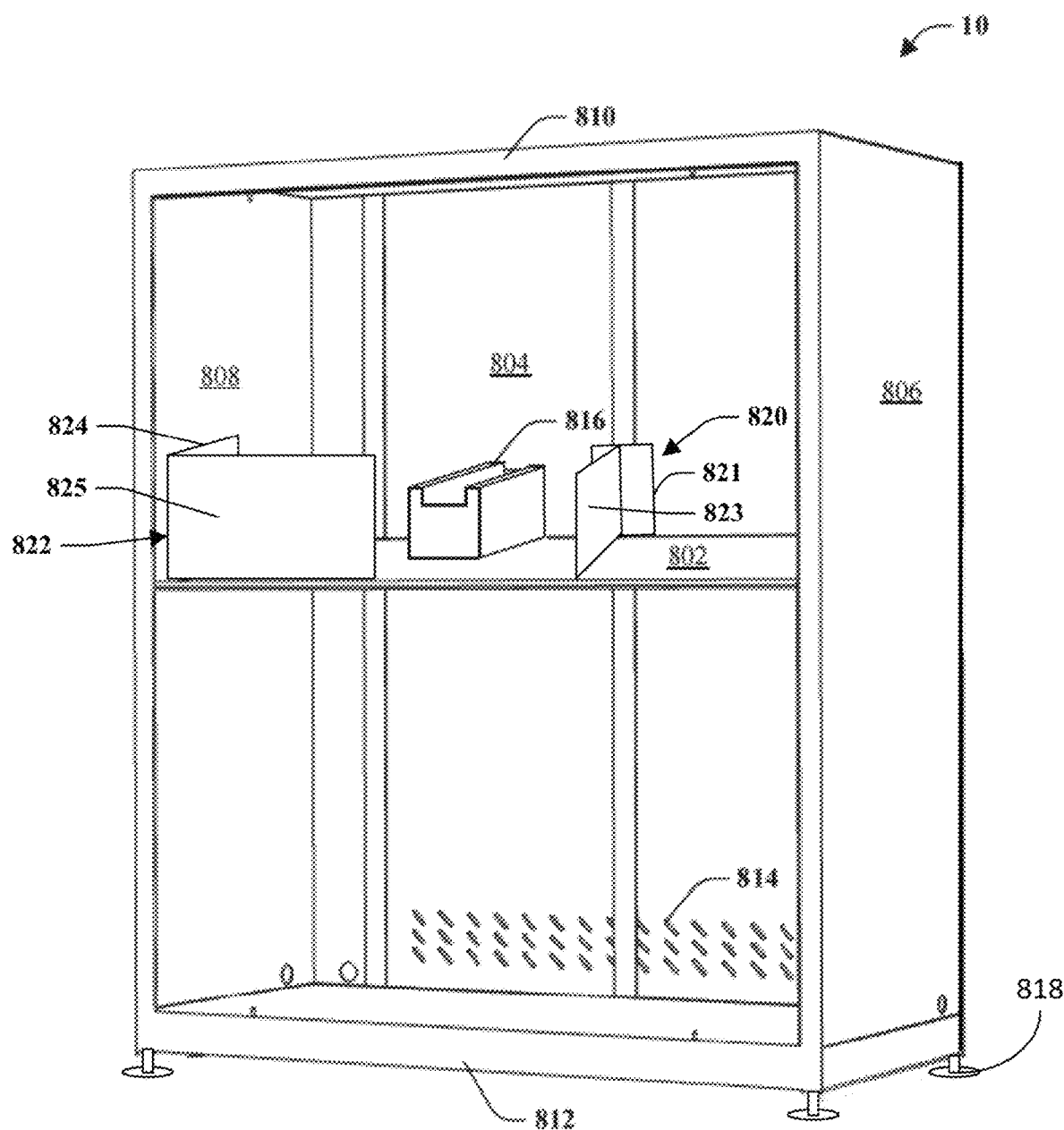
FIG. 8 is an illustration of an embodiment of a system for managing an inventory of items for an environment.
Figure 9:
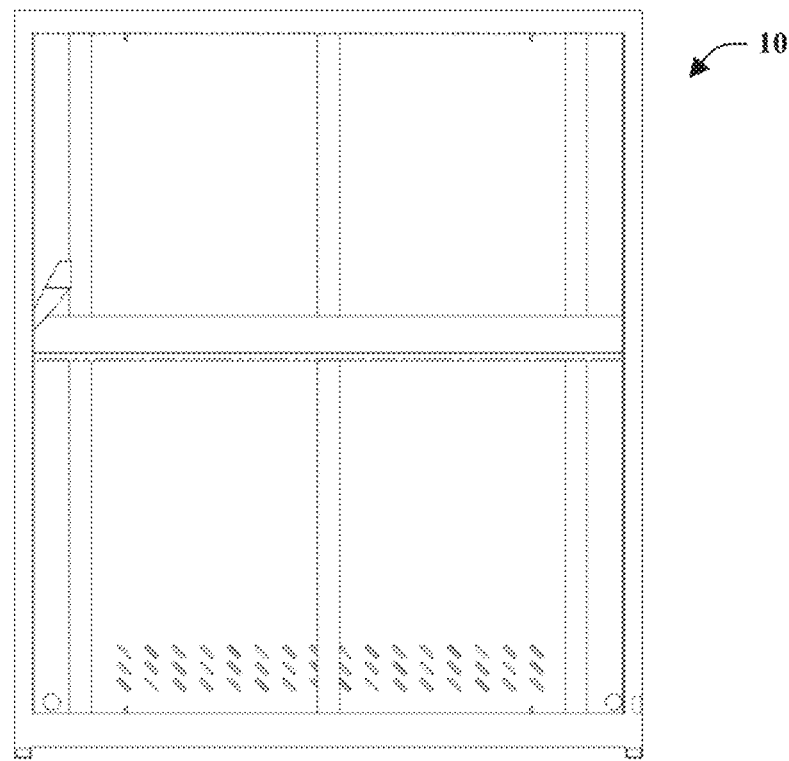
FIG. 9 is an illustration of a front view of an embodiment of a system for managing an inventory of items for an environment.
Figure 10:
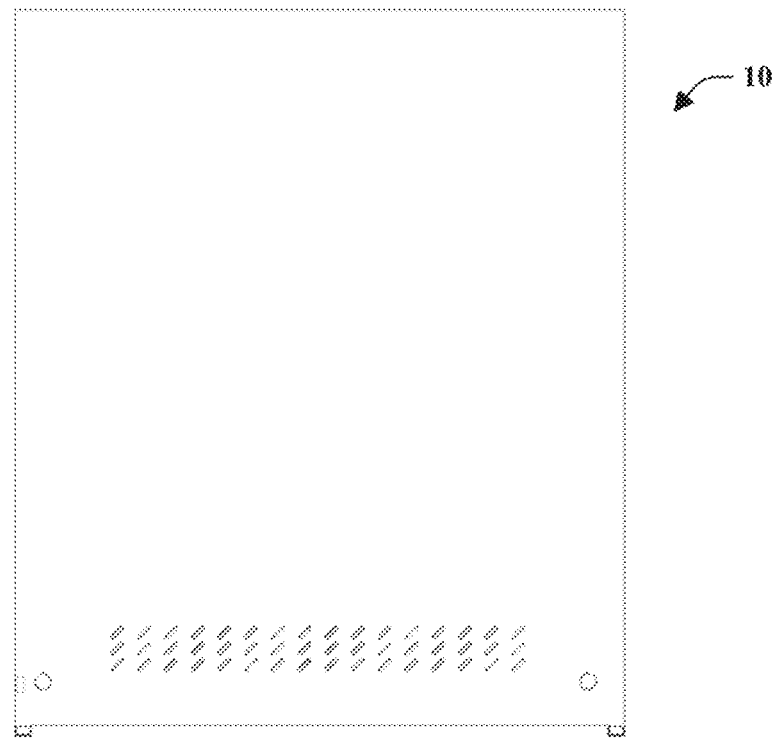
FIG. 10 is an illustration of a rear view of an embodiment of a system for managing an inventory of items for an environment.
Figure 11:
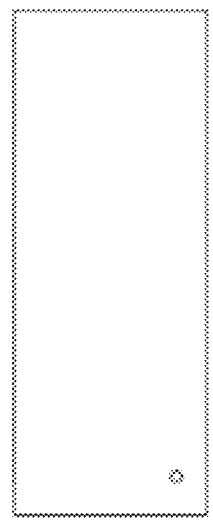
FIG. 11 is an illustration of a side view of an embodiment of a system for managing an inventory of items for an environment.
Figure 12:
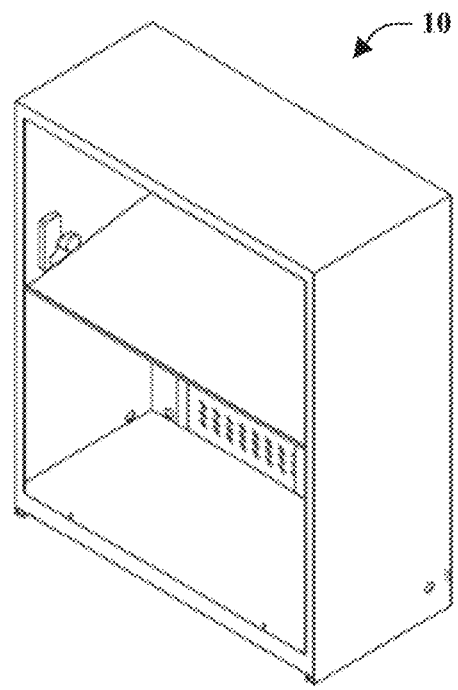
FIG. 12 is an illustration of a top right perspective view of an embodiment of a system for managing an inventory of items for an environment.
Figure 13:
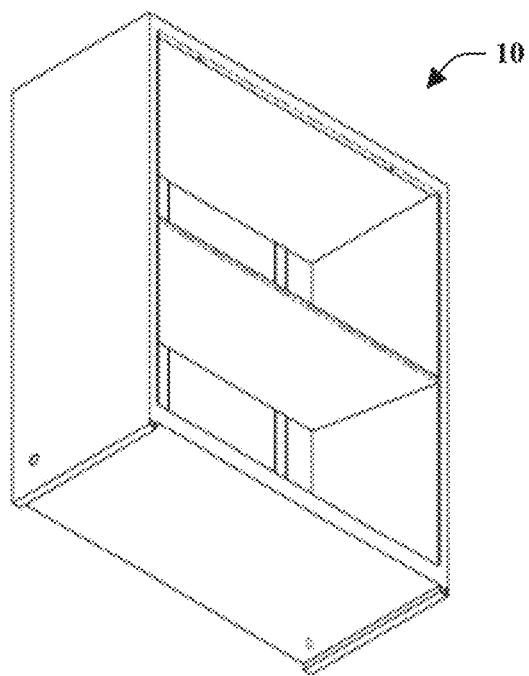
FIG. 13 is an illustration of a bottom left perspective view of an embodiment of a system for managing an inventory of items for an environment.

Turning to FIGS. 8-13, the storage container 10 is illustrated in another embodiment. The storage container 10 is illustrated without hinged doors in FIGS. 8-13 and it is to be appreciated based on at least the above description that the storage container 10 can include two or more doors hinged thereto. For example, each door can include one or more cameras attached or removeably coupled to a corner of an interior side of the door or a center edge of an interior side of one of the doors. FIG. 9 illustrates the storage container 10 in a front view. FIG. 10 illustrates the storage container 10 in a rear view. FIG. 11 illustrates the storage container in a right side view (with the left side view being a mirror image of the right side view. FIG. 12 illustrates the storage container 10 in a top perspective view. FIG. 13 illustrates the storage container 10 in a bottom perspective view.

The storage container 10 can be configured to vend a stored item to a user based on verification of the user, unlocking the doors, and monitoring access of the user and/or the stored item before verification, during verification, during access, and after the doors are secured. In a particular example, the storage container 10 can be energy efficient by maintaining a low energy state. The low energy state can include having cameras off, internal lighting off, and powering only the controller component 15 and/or the verification component 12. Upon verification of a user or upon activation of a keypad or screen that communicates with a user to determine verification, a camera, fixed to an exterior of the storage container 10, can be activated to capture who accesses or activated the keypad or screen to begin verification. After verification, the locks for the doors can be deactivated. Upon deactivation of the doors, a sensor can detect when a door is opened to power or activate one or more cameras that monitor the contents of the storage container 10. The cameras can be located on an interior side of at least one door and preferably in a corner (opposite of a hinged side) of a door or at a center edge (opposite of a hinged side) of a door. The cameras can be aimed to the internal area of the storage container 10 when the doors are approximately at a 90 degree in comparison to a front side of the storage container 10. As discussed, the storage container 10 includes a motion limiting device that restricts motion of at least one door so as to provide a line of site for the camera. This allows a camera to capture what is being taken out of the storage container 10.

The storage container 10 can include a first sidewall 806, a second sidewall 808 opposite the first sidewall 806, a top 810, a bottom 812 opposite the top 810, and a backwall 804. Inside the storage container 10 can include one or more shelves 802. The shelf or shelves 802 can support one or more items and in particular, can support a container 816. The container 816 can house one or more items that are secured in the storage container 10. As discussed above, the shelf 816 can include a corresponding camera on an interior side of a door to capture whether items have been removed from the container 816. The camera can be at a height location on the interior side of the door that corresponds to a height of the shelf 816 inside the storage container 10.

The shelf or shelves 802_can be removably coupled to an inside wall (e.g., backwall 804, first sidewall 806, second sidewall 808, top 810, bottom 812). For instance, an overlapping configuration (e.g., edge fitting or supported by a hook on an inside wall) can be used in which an edge of the shelf 802_can be engaged into a hook coupled or integrated onto the inside wall. In another embodiment, the shelf 802 can be stationary and non-removeably affixed by a weld. In addition to an overlapping configuration, the shelf 802_can be removeably coupled to the storage container 10 or inside the storage container 10 by a screw, bolt, weld, tongue and groove configuration, hook configuration, peg configuration, and the like.

The shelf 802 can be angled or slanted to allow for at least one of a line-of-site for a camera or for a user, wherein the line-of-site allows for a view into the storage cabinet 10 and the container 816. The shelf 802 can include a rectangular shape in which there is a front side (e.g., closest to the front of the storage container 10) and a backside (e.g., closest to the back of the storage container 10) opposite the front side. The backside can be raised a distance above the front side of the shelf 802. In particular, the inside walls can include a first set of hooks on two or more locations on the inside walls on a first plane and a second set of hooks on two or more locations on the inside walls on a second plane, wherein the first plane and the second plane can be separated by a distance. The distance can be above or below in which the first plane can be higher than the second plane or the second plane can be higher than the first plane. It is to be appreciated that there can be a number of planes for the sets of hooks so as to customize the distance between one or more shelves and/or the angles of the shelves 802. For instance, a frontside of the shelf 802 can be affixed to a first set of hooks on a first plane and the backside of the shelf 802 can be affixed to a second set of hooks on a second plane, wherein the second plane is a distance above the first plane providing an angle in comparison to a ground level of where the storage container 10 is located. Based on which hooks the edge of the shelf is engaged into can translate into a level shelf (e.g., level compared to a ground level) or a raised shelf 802 (where the backside of the shelf 802 is raised higher than the front side of the shelf 802), or a lowered shelf (where the front side of the shelf 802 is higher than the backside of the shelf 802). It is to be appreciated that the height of the shelf 802 can be manually adjusted, automatically adjusted, or a combination thereof.

In order for the container 816 to be stationary on a raised or angled shelf 802, the container 816 can include a magnet 1410 to maintain a location of the container 816 on the shelf 802. The magnet 1410 can be affixed to a bottom of the container 816, wherein the magnetism to a metal or metallic-based shelf 802 allows restriction of movement. The magnet 1410 can be affixed to a suitable location on the container 816. In an embodiment, the magnet 1410 can be affixed to the container 816 with a glue, epoxy, an adhesive, and the like. The storage container 10 can include one or more containers 816 each having a magnet or magnets to allow for customized layouts for containers and such layouts have restricted movement due to the magnetism to the shelf 802. The storage container 10 can include an "N" number of containers, each having a respective size or shape, where N is a positive integer.

In addition to a magnet, the container 816 can utilize a pad or material that has a high coefficient of friction to reduce movement on an angled or raised shelf 802. In another embodiment, the container 816 can include a sticker or tacky material on the bottom of the container 816.

Figure 14:
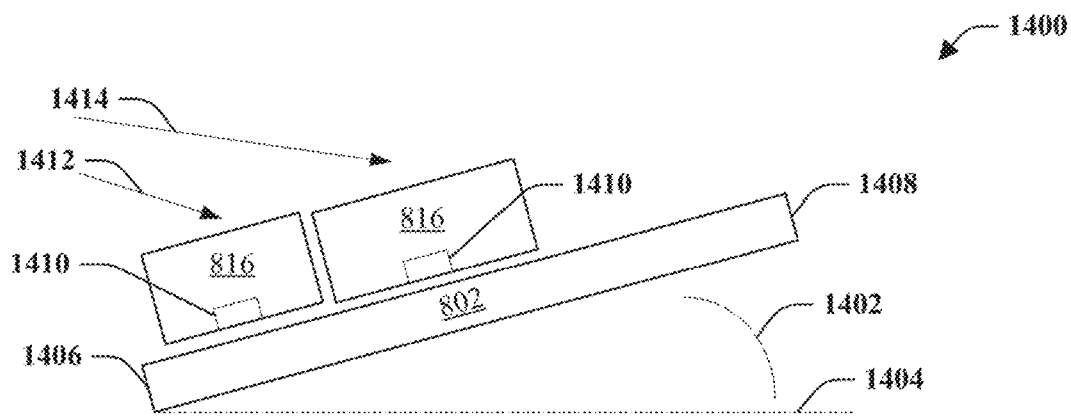
FIG. 14 is an illustration of an embodiment of shelf system for storage container.

Turning to FIG. 14, a cross-sectional view 1400 of the shelf 802 is illustrated. The shelf 802 can have a front side 1406 and a backside 1408, wherein the backside 1408 is higher than the front side 1406 in comparison to a ground level 1404. This configuration of the shelf 802 in FIG. 14 allows for the shelf 802 to have an angle 1402, wherein the angle can be approximately zero (0) degrees to approximately sixty (60) degrees. In an embodiment, the angle 1402 can be nine (9) degrees.

FIG. 14 further illustrates a first container 816 and a second container 816, each having a respective magnet 1410. It is to be appreciated that the containers can be oriented side-by-side or front-to-back (as depicted), or a combination thereof. The angle 1402 allows a first line-of-site 1412 for a camera that captures the removal or return of items housed by each container 816. The angle 1402 further allows a second line-of-site 1414 for a user to view items housed by each container 816.

It is to be appreciated that the height of the shelf 802 can be manually adjusted, automatically adjusted, or a combination thereof. For example, a height of the shelf 802 or angle of the shelf 802 can be adjusted based on a parameter, wherein the parameter is a user, a height of a user, a title of a user, a security clearance of a user, an amount of money dispensed into the storage unit 10, an inventory of an item on a shelf 802, an amount removed of a requested item by a user, a user's historical data related to accessing the storage container 10, and the like. In another embodiment, the angle of the shelf 802 can correspond to an accessibility of items on the shelf 802. For example, a flat or even (compared to ground level) can indicate unrestricted items or items on that flat or even shelf.

In an embodiment, the storage container 10 can identify a user and determine a height of such user. The height of the user can be utilized to adjust a height of the shelf 802 and/or an angle of the camera in order to capture the inside of the storage cabinet 10 without restriction of view. For example, a taller user can have the shelf or shelves 802 be angled with the front side 1406 higher than the backside 1408. In another example, a shorter user can have the shelf or shelves be angled with the front side 1406 lower than the backside 1408. Moreover, based on the height of the user, the camera aim or line-of-site to capture imagery can be adjusted such that a taller user would correspond to an up-angled view from the camera to the inside of the storage cabinet 10 and that a shorter user would correspond to a down-angled view from the camera to the inside of the storage cabinet 10. In another embodiment, an average height of users that can access the storage cabinet 10 can be used as a baseline height for the camera(s) line-of-site and/or the angle 1402 of the shelf or shelves 802, wherein if a user is above the baseline, an adjustment is made for the camera or the shelf.

Figure 15:
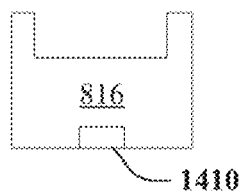
FIG. 15 is a front view of the container having a magnet attached.
Figure 16:
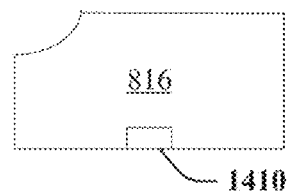
FIG. 16 is a side view of the container having a magnet attached.
Figure 17:
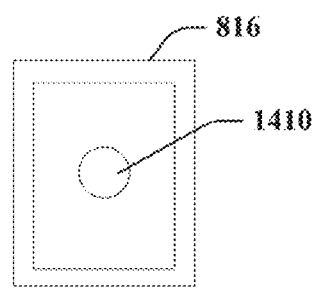
FIG. 17 is a top view of the container having a magnet attached.
Figure 18:
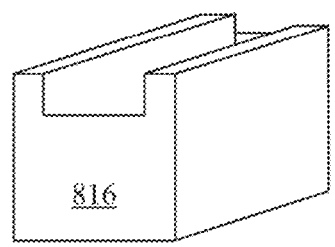
FIG. 18 is a perspective view of the container having a magnet attached.

FIGS. 15-18 illustrate the container 816. The container 816 can house one or more items, wherein the container 816 can be a size, shape, color, or fabricated by a material (e.g., metal, plastic, polymer, alloy, and the like). In a particular embodiment, the container 816 can be fabricated out of a plastic having a bright green tint. FIG. 15 is a front view of the container 816 having a magnet attached. FIG. 16 is a side view of the container 816 having a magnet attached. FIG. 17 is a top view of the container 816 having a magnet attached. FIG. 18 is a perspective view of the container 816 having a magnet attached. It is to be appreciated that the magnet 1410 and/or the container 816 can be any suitable shape or size that holds a volume and can be chosen by sound engineering judgment.

As described above, systems and methods herein include various computer hardware and software aspects. In some embodiments described above, open or closed networks between containers and associated circuits and logic can be used to integrate inventory management end-to-end through business units, locations, or entire enterprises. Information can be aggregated and shared between containers as well. Computers not directly associated with container systems can also be used to access, display, and process information generated from container systems.

In an example, iteration of an inventory activity utilizing such combined hardware and logic, a system begins by authenticating a user, wherein such authentication can be biometric, a password, an ID badge scan, magnetic stripe, barcode, an input from a user, among others. Thereafter, a container of the system can be un-secured to allow access to allow one or more items to be accessed. In embodiments, a barcode scanner is provided to track taking or returning items, and the user scans a barcode on the item to identify such taking or returning. The information gleaned from the barcode scanner can, in some embodiments, be corroborated by information from another sensor (e.g., scale). Alternatively, another sensor can be utilized in place of a barcode scanner. During this time, a video camera can also be recording the activity. The container can be closed and re-secured after the desired items are removed and accounted for. After the transaction is complete, or at regular intervals, information can be retrieved from the system. Retrieval of information can be performed locally or remotely, and automatically or manually with human interaction. This information can be stored in a database facilitating review and management of inventory information. The database can be leveraged by administrators and managers, as well as, supply personnel who can use system information to replenish inventory and forecast demand. Notifications can be generated and transmitted to ensure the appropriate personnel are aware when action is required (e.g., inventory low, specific item taken, fraud or abuse). The information can be, but is not limited to, information of frequency of use of the item, number of items taken, number of items returned, information related to a condition of the item, a record of who is taking an item, a record of who is returning an item, a record of a duration of time the item was used, tracking of a job the item was used, among others. Information may be connected to various outside systems for replenishment, asset tracking, reporting among others.

Turning back to FIG. 2, the storage container 10 is illustrated. In an embodiment, at least one of the first door or the second door can be coupled with at least one door extension arm 11 that includes a first end and a second end opposite thereto. The door extension arm 11 can further include means to provide a force to open and/or close the door without a users input or effort. The door extension arm 11 can be attached at a top of the door, a bottom of the door, or a combination thereof. The other end of the door extension arm 11 can be secured to a point located on the frame or structure of the storage container. The door extension arm 11 biases the door towards an open position. In another embodiment, the door extension arm 11 can be used to bias the door towards a closed position. Moreover, a first pair of door extension arms can be used on a first door (e.g., located at the top and bottom of the first door) and a second pair of door extension arms can be used on a second door (e.g., located at the top and bottom of the second door).

By way of example, if a door extension arm 11 is coupled to the second door, the first door secures the second door shut when the doors are in a closed position. When a user opens the first door, the door extension arm 11 imposes an outward force, causing the second door to open automatically. Door extension arm 11 can comprise at least one of a spring, a pneumatic piston, a hydraulic piston, or a combination thereof to provide a force to open and/or close the door.

With further reference to FIG. 2, cameras 14 may also exist on any exterior surface of the storage container 10. A camera 14 may be mounted on either side or the back of the storage container 10. This placement of the camera 14 allows for viewing or surveillance of the immediate area surrounding the storage container 10 and can view any person or thing approaching the storage container 10 regardless of what direction the person or thing comes from.

Turning back to FIG. 5, the storage container 10 is illustrated with additional features and embodiments. The storage container 10 further comprises an air purifying and/or filtration system 19 (further referred to as "air purifying system") that is configured to receive air from inside the storage container 10 and filter this air with an air filter and pump the filtered air to the inside of the storage container 10. It is to be appreciated that the air purifying system 19 can be located within the storage container 10, outside the storage container 10, or a combination thereof. Air purifying system 19, for example, can utilize an air pump and a filter. By way of example and not limitation, the filter can be a HEPA filter, ionic air filter, activated carbon filter, Ultraviolet (UV) light air filter, among others. Air purifying system 19 can maintain the interior of the storage container 10 free from excess dust, particulates, odors, or fumes with the circulation of air inside via the pump and the filter.

Referring back to FIG. 8, the storage container 10 is illustrated and can be supported by one or more adjustable feet 818 wherein the vertical position of each of the four adjustable feet 818 is individually adjustable to account for uneven floors or surfaces. Adjustable foot 818 can include a base portion and a shaft portion. The base portion can be any shape, including circular, polygon-shaped, triangle-shaped, or square-shaped, and is in contact with the ground or surface the storage container 10 is situated. The shaft portion is attached to the base portion on one end and is engaged with the bottom surface or frame of storage container 10 on its other end. In an embodiment, the shaft portion is threaded and is vertically adjustable by way of rotating the shaft portion. In certain embodiments, an adjustable foot 818 can be engaged with the storage container 10 at each of the storage container's 10 four bottom corners. Vertically adjusting an individual adjustable foot 818 can cause the respective corner of the storage container 10 to be raised or lowered. In this manner, the storage container 10 may be levelled or tilted by way of raising or lowering the adjustable feet 818 as desired. It is to be appreciated that the adjustable feet 818 can be located on the corners, the perimeter of the base, within the middle of the base, or any other location that can be beneficial to ensure the storage container is level. In another embodiment, a customizable system for the adjustable feet 818 can be employed with the storage container 10 such that a user can place the adjustable feet on the base of the storage unit at user-defined locations. Such feet can be attached to caster type wheels or be installed by themselves in addition to wheels, or without wheels altogether.

As further seen in FIG. 8, a customizable partition system is illustrated. The customizable partition system can include partitions within or on each shelf 802. The customizable partition system can include a first partition 820 and/or a second partition 822, wherein each can be arranged within the storage container 10 to create one or more compartments on the shelf 802. It is to be appreciated that the first partition 820 and the second partition 822 can be used together or independently. First partition 820 comprises a magnetic base portion 821. In other embodiments, the first partition's base portion 821 may comprise other means of attachment such as hook-and-loop connectors (e.g. Velcro), adhesive, screw attachments, suction cups, mounting hooks/loops, among others. The magnetic base portion 821 removeably attaches flush with the inside surface of the back wall 804 of the storage container 10. A divider member 823 can extend perpendicular to the magnetic base portion 821. In an embodiment, the divider member 823 extends from a center of the magnetic base portion 821, creating a "T" shaped partition. Second partition 822 comprises a magnetic base portion 824. In other embodiments, the second partition's base portion 824 may comprise other means of attachment such as hook-and-loop connectors (e.g. Velcro), adhesive, screw attachments, suction cups, mounting hooks/loops, among others. The magnetic base portion 824 removeably attaches flush with an inside surface of either the first side wall 806 or second side wall 808. A barrier member 825 extends perpendicular to the magnetic base portion 824. In an embodiment, the barrier member 825 extends from one end of the magnetic base portion 825, creating an "L" shaped partition.

The first partition 820 and second partition 822 can be arranged or positioned in such a manner that the divider member 823 of the first partition 820 and the barrier member 825 of the second partition 822 meet perpendicularly to form a compartment on the shelf 802 with the first partition 820 forming a side of the compartment and the second partition 822 forming a front end of the compartment. In embodiments, multiple first partitions 820 and multiple second partitions 822 are arranged to create a plurality of compartments within the interior of the storage container 10 on the shelf 802 or on a plurality of shelves 802.

Figure 19:
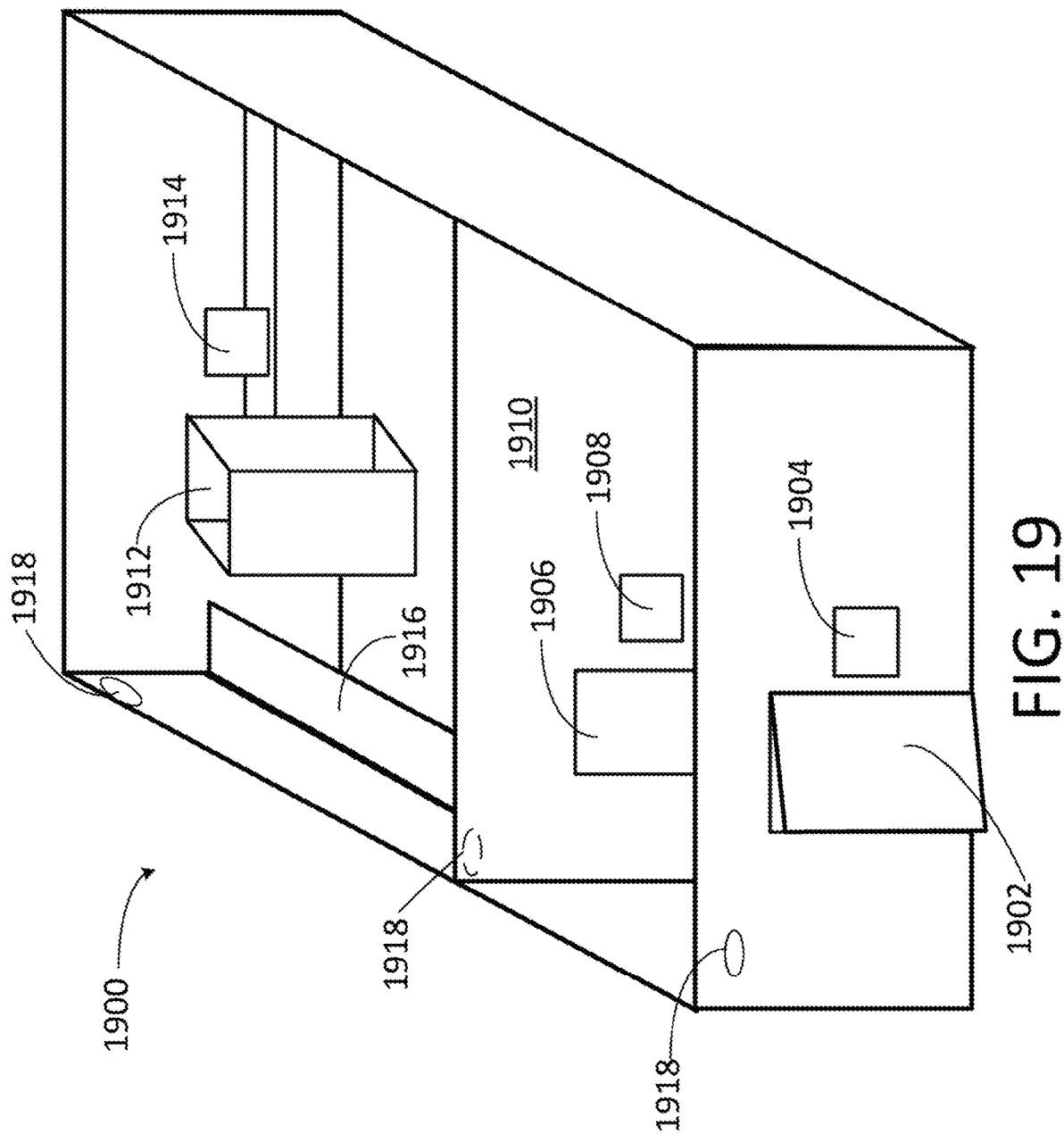
FIG. 19 is a perspective view of an embodiment of the shipping container.

FIG. 19 shows a perspective view of an embodiment of an inventory system 1900. The inventory system 1900 can be used with a shipping container, a storage room, a truck trailer, a storage unit, a room rented to store items, a barn, a shed, a tent, a garage, a mobile home, a truck body, among others. The system 1900 can be employed with a shipping container that is removeably coupled to a truck trailer or semi. For instance a truck trailer system can include a vehicle and a removable trailer. In certain embodiments, the removable trailer can be attached and transported via either a truck or a train. The removable trailer or storage room can have a double-door on an end that allows access to an interior. Often, the removable trailer can be transported to a location. The removable trailer can be placed in any suitable location such as personal property or land, ships, drilling rigs, vehicles, hospitals, schools, retail stores, construction sites, mines, among others. This removable trailer can be adapted to become an inventory system 1900. It is to be appreciated that a type of a removable trailer can be a shipping container. The inventory system 1900 is illustrated in FIG. 19 as a shipping container but it is to be appreciated that any suitable room or trailer or compartment can be utilized with the subject innovation. For the below description and ease of readability, a shipping container 1900 is described. The shipping container 1900 encloses an interior. Shipping container 1900 can be any size that accommodates the entry of a user as well as providing space for storing items. For example, the shipping container 1900 can have a width corresponding to a trailer or truck. For example, the shipping container can have a width of 8 feet, 9 inches which corresponds to a standard truck width. The length of the shipping container 1900 can vary as well. For example, the shipping container 1900 can be a 52 foot-long trailer or a 10 foot, 20 foot, or 40 foot-long container.

Shipping container 1900 can have a first entry door 1902 that provides access to a security barrier 1910 within the interior of the shipping container 1900. In an embodiment, an external verification component 1904 can be located adjacent to the first entry door 1902. The external verification component 1904 is configured to receive a portion of data from a user as input to determine whether the user is allowed access to the shipping container 1900 through the first entry door 1902. First entry door 1902 can have a locking component. In an embodiment, the locking component is magnetically actuated. In other embodiments, the locking component is a mechanical lock and/or a latch system that can receive a padlock. External verification component 1904 deactivates first entry door's 1902 locking component upon proper user verification. In the embodiment of the shipping container 1900 being a removable trailer for a truck, the first entry door 1902 can be double-doors that are latched and secured with a padlock, wherein the external verification component 1904 is not used.

Security barrier 1910 can include a second entry door 1906. The second entry door 1906 can provide a user access to a secure room upon proper user verification or validation. It is to be appreciated that the second entry door 1906 can include additional security features to gain access in comparison to the first entry door 1902. For example, the first entry door 1902 can include a latch and padlock for security measures, wherein the second entry door 1906 can include internal verification component 1908 in addition to a locking component (e.g., padlock or magnetic lock). By way of example, the security barrier 1910 can be a metal fence that is adjustable in width and height to account for a size of the shipping container 1900 dimensions. In certain embodiments, security barrier 1910 can be a solid wall. The security barrier 1910 can be adjustable to accommodate shipping containers of various widths or sizes. For example, the security barrier can have detachable extension pieces that can be added or removed, or it may consist of telescoping parts that can be extended or contracted to fit the width of the shipping container 1900.

In an embodiment, an internal verification component 1908 can be located on the security barrier 1910 adjacent to the second entry door 1906. The internal verification component 1908 is configured to receive a portion of data from a user as input to determine whether the user is allowed access to the secure room through the second entry door 1906. The data received from the user can be data from a security badge, a lanyard, a code, a PIN, an employee number, a combination of digits or letters, a user name, among others. Second entry door 1906 can have a locking component. In an embodiment, the locking component is magnetically actuated. In other embodiments, the locking component is a mechanical lock. Internal verification component 1908 deactivates second entry door's 1906 locking component upon proper user verification, providing the user access to the secure room. In some embodiments, an exit button exists inside of the secure room. When a user activates the exit button, the second entry door's 1906 locking component disengages, allowing the user to exit the secure room through the second entry door 1906. In further embodiments, another exit button may be used in a similar fashion to disengage the first entry door's 1902 locking mechanism in order to allow the user to exit through the first entry door 1902 in order to allow exit in case of an emergency.

The inventory system 1900 can house various shelving 1916. The shelving can hold one or more items 1914. The inventory system 1900 can also include a control enclosure 1912 which comprises a controller component 15. In an embodiment, the inventory system 1900 can also house a scanning device 16 which may be removably docked on top of or inside of the control enclosure 1912. In some embodiments, a command sheet is housed within the inventory system 1900. A user can utilize the scanning device 16 to scan a barcode or an indicia on the command sheet to provide instructions to the controller component 15. For example, a user can scan a bar code printed on the command sheet that instructs the controller component 15 to undo the last scan or action. As another example, a user can scan a bar code printed on the command sheet to notify the controller component 15 that the next scan input represents an item that is going to be accessed, borrowed, or taken.

The inventory system 1900 can also comprise a camera system having one or more cameras 1918. In certain embodiments, a camera 1918 can be mounted on an exterior wall of the shipping container 1900. The camera 1918 can be mounted in such a way to focus and record an image of a user approaching or standing at the first entry door 1902. A camera 1918 may also be located within the first entry door 1902, but in front of the security barrier 1910. This camera 1918 can be mounted in such a way to focus and record an image of a user standing at the second entry door 1906. In further embodiments, cameras 1918 can be mounted inside of the secure room. For example, any number of cameras 1918 can be mounted on any of the interior walls of the secure room or mounted in any of the four corners of the secure room. A digital video recorder system can be used to keep records of the camera footage. This system can allow a user or administrator to view camera footage that is stored on a computer hard drive. This digital video recorder system and hard drive can be located within the shipping container 1900 or they can be located external to the shipping container 1900.

With further reference to FIG. 19, cameras 1918 may also exist on any exterior surface of the shipping container 1900. A camera 1918 may be mounted on either side or the back of the shipping container 1900. This placement of the camera 1918 allows for viewing or surveillance of the immediate area surrounding the shipping container 1900 and can view any person, vehicle, object, or large products approaching the shipping container 1900 regardless of what direction the person or thing comes from.

Figure 20:
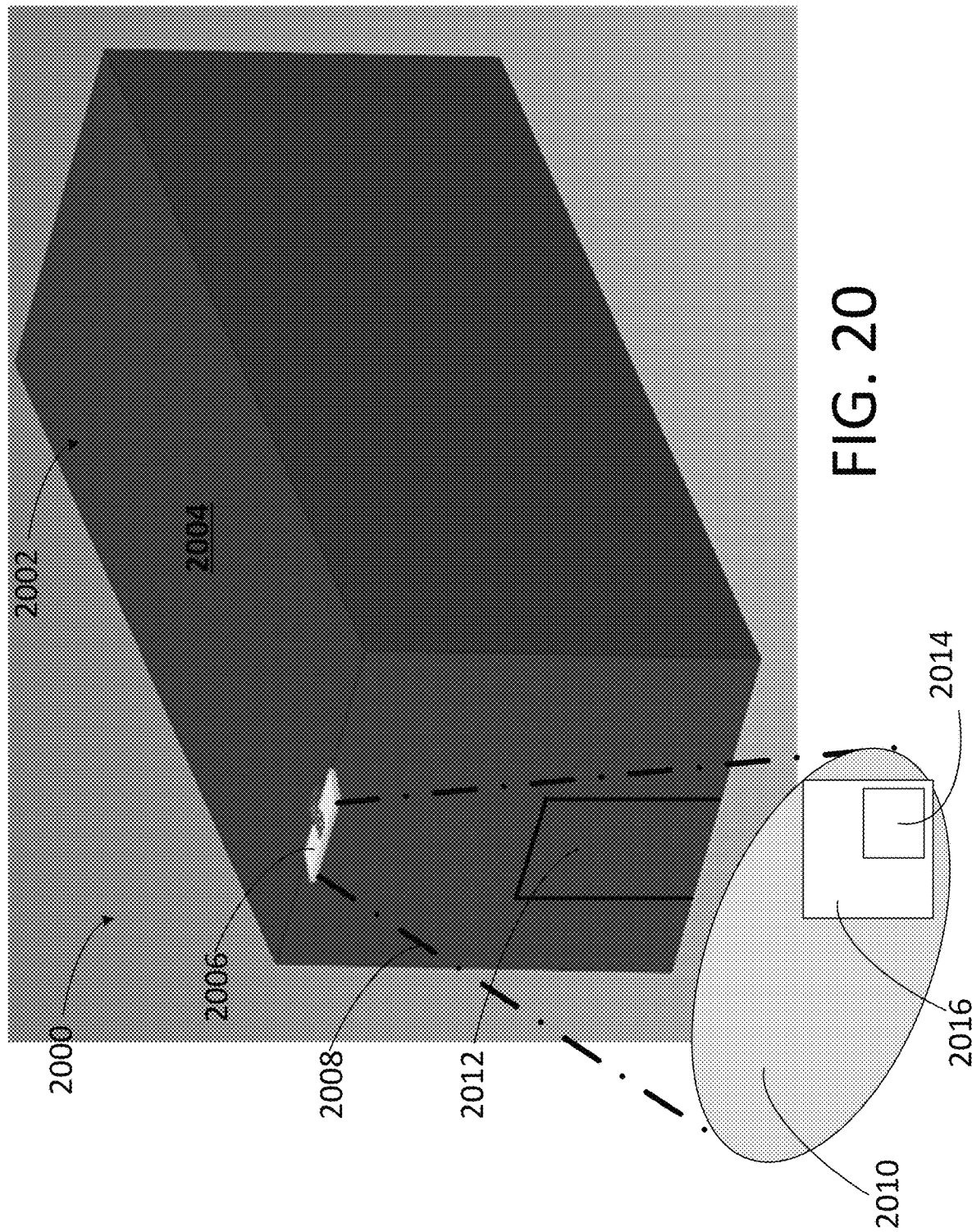
FIG. 20 is a perspective view of an embodiment of an inventory system.

Turning now to FIG. 20, one embodiment of the inventory system 2000 includes a container 2002. It should be appreciated that the inventory system 2000 can include any of the components and features as described with respect to inventory system 1900. The inventory system 2000 can be fully enclosed by a plurality of exterior walls and a roof 2004. The inventory system 2000 can further include a wireless tracking system configured to track a collection of items stored within the container 2002 that are available to a user. The wireless tracking system can include a wireless transceiver 2006 mounted to an exterior surface of the container 2002. In certain embodiments, the wireless transceiver 2006 can be a radio frequency identification (RFID) transceiver. In one embodiment, the wireless transceiver 2006 can be mounted to the roof 2004 of the container 2002. In other embodiments, the wireless transceiver 2006 can be mounted to exterior walls of the container 2002. The wireless transceiver 2006 can be configured to transmit a transmission signal 2008 towards an area 2010 outside of the first entry door 2012 of the container 2002.

A wireless transmitter 2014 can be affixed to an item 2016 of the collection of items stored within the container. In certain embodiments, the wireless transmitter 2014 can be a passive radio frequency identification (RFID) transmitter. The wireless transmitter 2014 can be pre-programmed with an identifier that corresponds to the item 2016. In certain embodiments, the identifier can be a serial number, a name, a product description, among others. Upon entering the area 2010 covered by the transmission signal 2008, the wireless transmitter 2014 can receive the transmission signal 2008, which energizes the wireless transmitter 2014 and causes the wireless transmitter 2014 to emit a return signal that contains the identifier. The return signal can be received by the wireless transceiver 2006, which can transmit the return signal to a controller component 15 by way of a wired signal or a wireless signal. In certain embodiments, the wireless transceiver 2006 can communicate with the controller component 15 by way of a coaxial connection, ethernet, fiber-optic, wi-fi, Bluetooth, among others.

Figure 21:
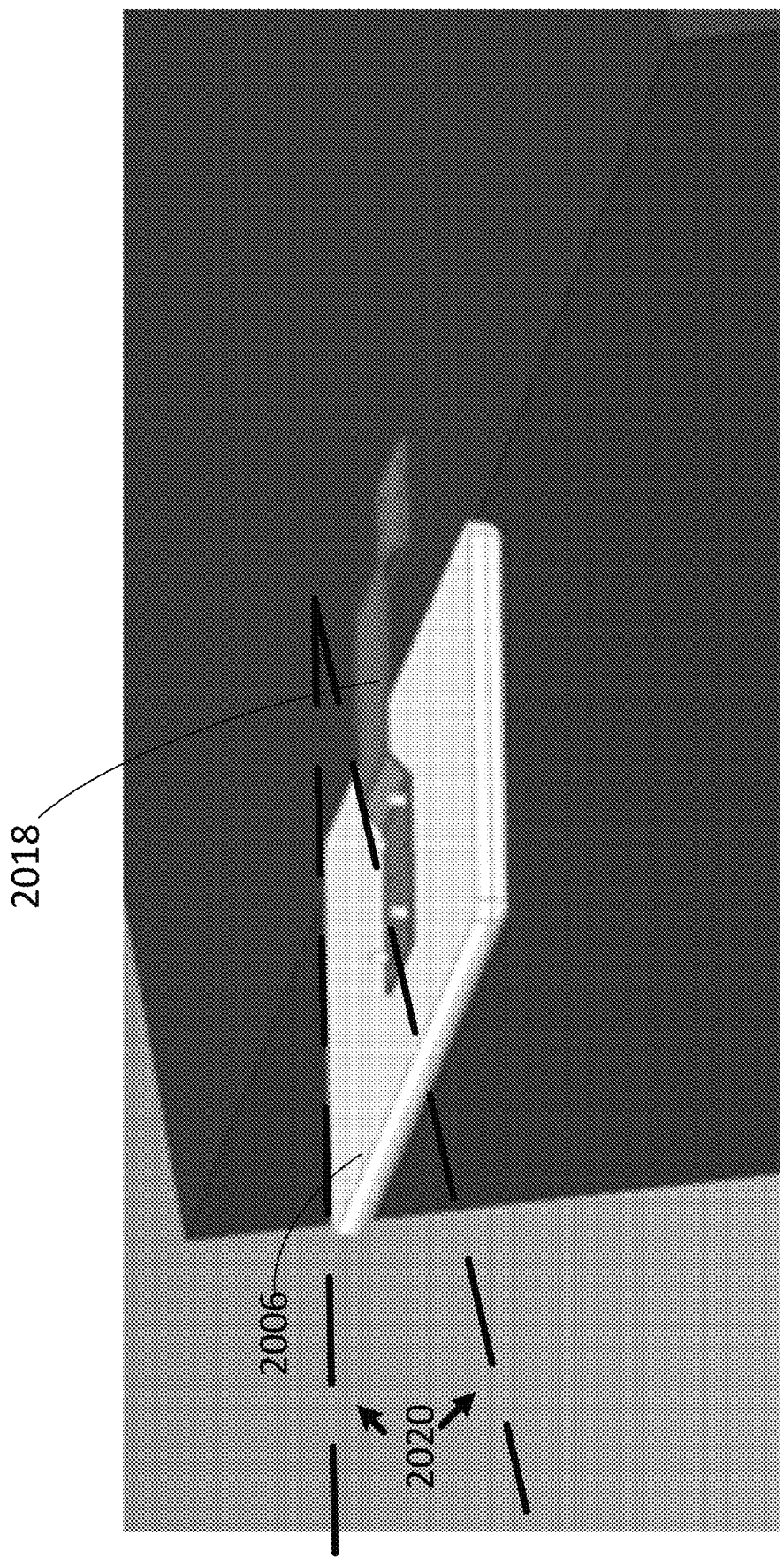
FIG. 21 is a perspective view of an embodiment of a transceiver.

Turning now to FIG. 21, an exemplary wireless transceiver 2006 is mounted to a roof 2004 of the container 2002 by way of a bracket 2018. The bracket 2018 can be configured to allow a user to bend the bracket 2018 in at least one dimension to adjust an angle 2020 of the wireless transceiver. For example, a user can bend the bracket 2018 upwards or downwards to adjust the angle 2020 of the wireless transceiver 2006 to an angle of between 0 degrees and 90 degrees, inclusive, as measured from a horizontal plane extending from the roof 2004. Bending the bracket 2018 can allow a user to modify the direction of the transmission signal 2008 transmitted from the wireless transceiver 2006 and locate a desired position of the area 2010 in which the transmission signal 2008 reaches, in a first direction. In other embodiments, a user can also twist or rotate the bracket 2018 to adjust the direction of the transmission signal 2008 transmitted from the wireless transceiver 2006 and locate a desired position of the area 2010 in which the transmission signal 2008 reaches, in a second direction perpendicular to the first direction. In one embodiment, a user can adjust the direction of the transmission signal 2008 such that the area 2010 is located immediately outside of the first entry door 2012 such that a user cannot carry an item having a wireless transmitter 2014 into or out of the first entry door 2012 without the wireless transceiver 2006 detecting a return signal from the wireless transmitter 2014. In one embodiment, a user can adjust the direction of the transmission signal 2008 such that the transmission signal 2008 avoids contact with any metallic surfaces, which would cause reflections of the transmission signal 2008 and therefore unpredictable location of the area 2010.

Figure 22:
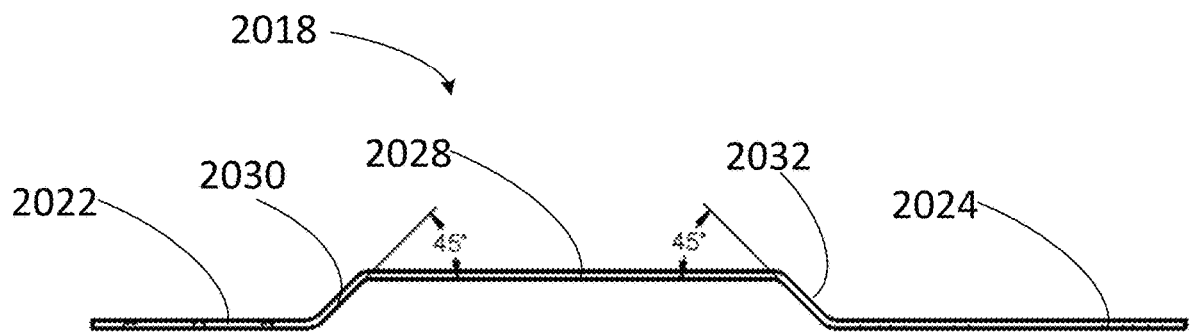
FIG. 22 is a front view of an exemplary bracket.
Figure 23:
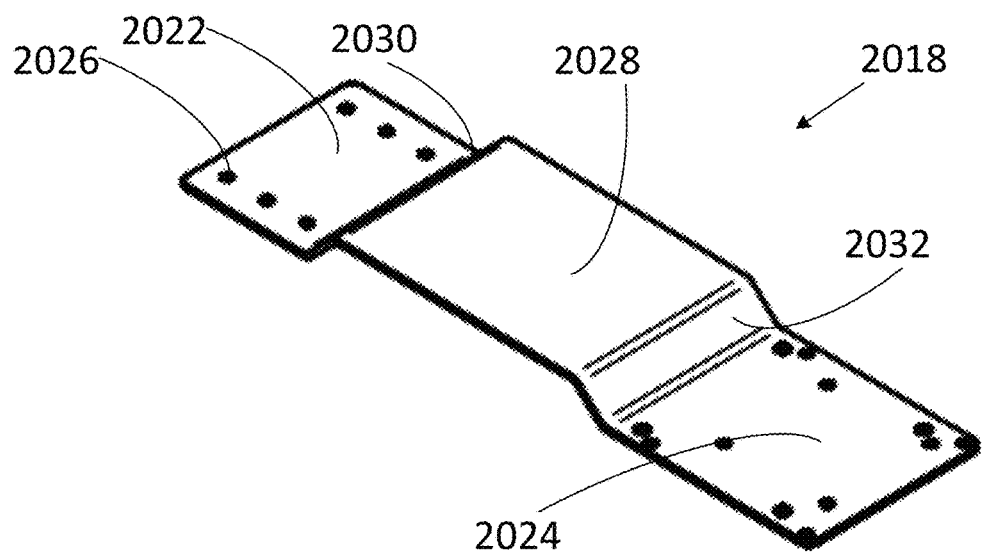
FIG. 23 is a perspective view of an exemplary bracket.

Turning now to FIGS. 22 and 23, an exemplary bracket 2018 is shown. The bracket 2018 can include a first mounting portion 2022 and a second mounting portion 2024, which are each flat, and include one or more holes 2026 for receiving one or more fasteners such as screws or nails for mounting into a surface of the container 2002 such as the roof 2004. The bracket 2018 can further include a middle portion 2028 extending in between the first mounting portion 2022 and the second mounting portion 2024. The middle portion 2028 can be flat. In certain embodiments, the middle portion 2028 can connect to the first mounting portion 2022 at a first end by way of a first bend 2030, and to the second mounting portion 2024 at a second end by way of a second bend 2032. In one embodiment, the first bend 2030 and the second bend 2032 can connect to the middle portion 2028 and the respective mounting portion each at 45 degree angles. It should be appreciated that the angles at which the first bend 2030 and the second bend 2032 connect with the other portions can be independently adjusted and/or bent by a user to achieve a desired angle 2020 of transmission signal 2008.

Figure 24:
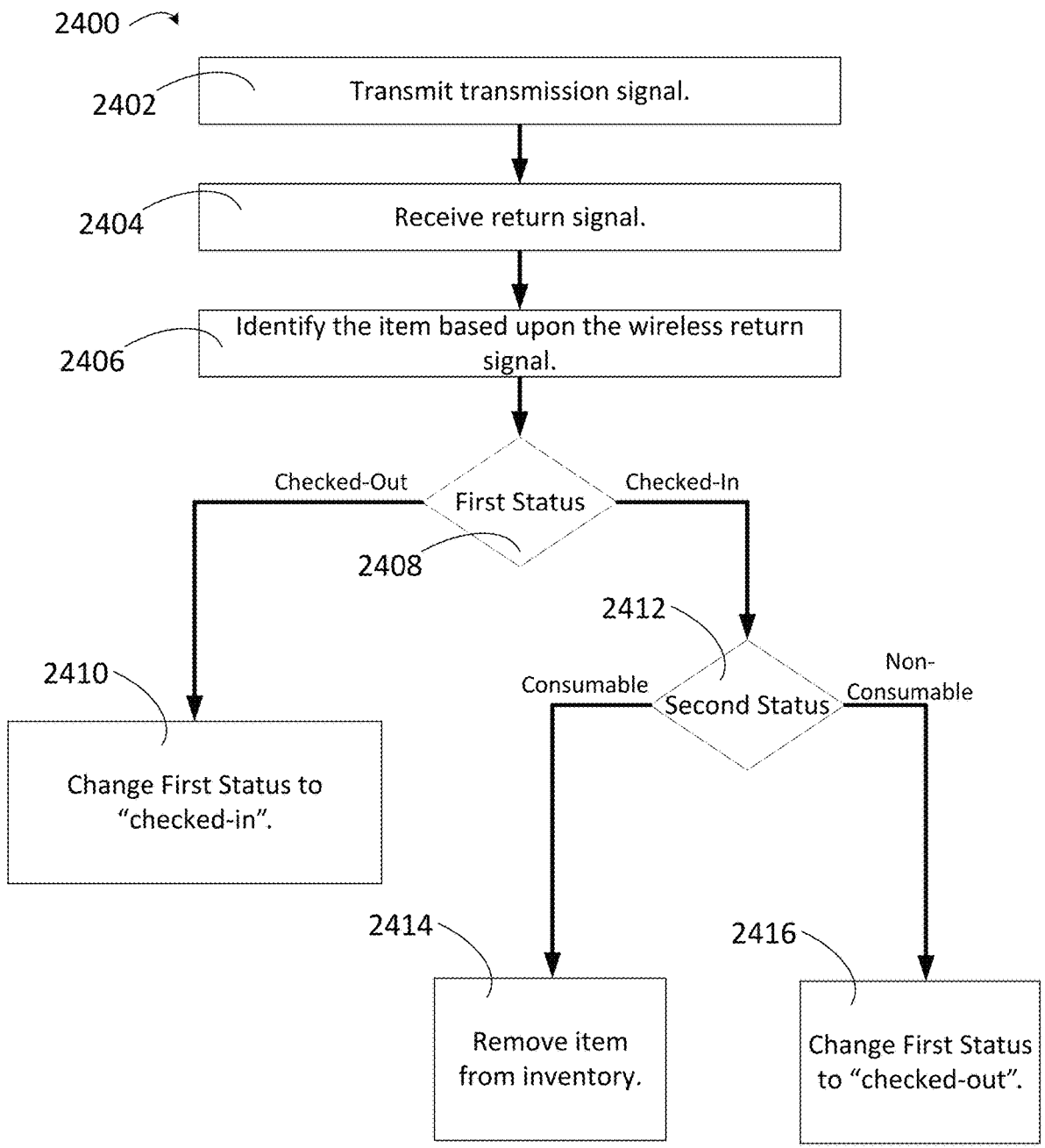
FIG. 24 is a flow diagram of a method of operating an inventory.

FIG. 24 depicts a flow chart of a method 2400 for tracking a collection of items. At reference numeral 2402, the wireless transceiver 2006 transmits a transmission signal 2008 towards an area 2010 outside of an entrance 2012 to the container 2002. When a wireless transmitter 2014 affixed to an item 2016 enters the area 2010, it can be energized by the transmission signal 2008. In response to being energized by the transmission signal 2008, the wireless transmitter 2014 can transmit a return signal that contains an identifier corresponding to an item 2016 associated with the wireless transmitter 2014. At reference numeral 2404, the wireless transceiver 2006 receives the return signal from the wireless transmitter 2014 that is affixed to an item 2016 of a collection of items. The wireless transceiver 2006 can transmit the return signal and/or the identifier contained within the return signal to a controller component 15. At reference numeral 2406, the controller component 15 identifies the item 2016 based upon the return signal. For example, the controller component 15 can identify the item 2016 based upon the identifier contained in the return signal by comparing the identifier to a database of items.

Within the controller component 15 or a memory in communication with the controller component 15, a first status and a second status can be stored for each item. The first status can provide an indication of whether the particular item is currently checked-in or checked-out. A checked-in status indicates that the particular item is likely currently located within the container 2002. A checked-out status indicates that the particular item has been removed from the container 2002. The second status can provide an indication of whether the particular item is a consumable item or a non-consumable item. A consumable item is an item that, when checked-out, is not intended to be returned. For example, a consumable item may be used and discarded by a user or may be an item that is only used once. Examples of consumable items are food items, disposable utensils, disposable gloves, face masks, ear plugs, nails, screws, among others. A non-consumable item is an item that, when checked-out is intended and expected to be returned. Examples of non-consumable items are hand tools such as hammers, screw drivers, and pliers, and power tools such as drills, saws, among others.

At reference numeral 2408, the controller component 15 determines whether the first status of the item 2016 is checked-in or checked out. If the first status of the item 2016 is checked-out, then the method 2400 proceeds to reference numeral 2410 where the controller component 15 changes the first status to "checked-in". In this situation, the inventory system detects that the item 2016, which was currently checked-out, is being brought back and returned by a user. On the other hand, if the first status of the item 2016 is checked-in, then the method 2400 proceeds to reference numeral 2412, where the controller component 15 determines whether the second status indicates that the item 2016 is consumable or non-consumable. In this situation, the inventory system detects that the item 2016, which was currently checked-in, is being removed and checked-out by a user.

If the second status indicates that the item 2016 is a consumable item, the method 2400 proceeds to reference numeral 2414, where the controller component 15 removes the item from inventory. To achieve this, the controller component 15 can, for example, remove the item from a database, or decrease a quantity of the item. In this situation, the inventory system detects that a consumable item is being taken by a user, without the expectation of the item being returned. On the other hand, if the second status indicates that the item 2016 is non-consumable, the method 2400 proceeds to reference numeral 2416, where the controller component 15 changes the first status of the item 2016 to "checked-out". In this situation, the inventory system detects that a non-consumable item is being taken by a user, and there is an expectation that the item will be returned at a later time.

While aspects herein have generally been described in reference to management of office supplies, it is understood that systems and methods herein can be applied to other environments as well. For example, container systems herein can be used in food service, laboratory environments (including "clean rooms"), and others.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., does not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An inventory system, comprising:
   a container having a first entry door that provides access to a security barrier contained within the container, the security barrier having a second entry door;
   a verification component located on the security barrier adjacent to the second entry door that is configured to receive a portion of data from a user to complete a verification of the user;
   a lock mechanism for the second entry door that secures an access through the second entry door, allowing the user to enter a secure room located within the container, based upon the verification of the user, wherein the secure room is defined by the security barrier, a rear wall opposite the security barrier, a first sidewall, and a second sidewall opposite the first sidewall;
   a wireless tracking system configured to track a collection of items stored within the container that are available to the user, the wireless tracking system comprises:
      a wireless transmitter affixed to an item of the collection of items within the container; and
      a wireless RFID transceiver mounted to an exterior surface on top of the container at an angle between 0 degrees and 90 degrees, inclusive, as measured from a horizontal plane extending from the top of the container, wherein the wireless RFID transceiver is configured to transmit a transmission signal towards an area outside of the first entry door and receive a return signal from the wireless transmitter when the wireless transmitter is energized by the transmission signal; and
   a controller component that is configured to determine an inventory of the collection of items in the container based at least partially on the wireless return signal received by the wireless transceiver of the wireless tracking system, wherein the controller component is configured to store a first status of each item of the collection of items, wherein the first status comprises an indication of whether each item is checked-in or checked-out, and wherein the controller is configured to, upon receiving the wireless return signal from the wireless transmitter:
      upon determining that the item has a checked-in first status, change the first status to checked-out, or
      upon determining that the item has a checked-out first status, change the first status to checked-in.

2. The inventory system of claim 1, wherein the wireless transceiver is mounted to the container using a bracket configured to bend in at least one dimension to adjust the angle of the wireless RFID transceiver.

3. The inventory system of claim 1, wherein the controller component is configured to store a second status of each item of the collection of items, wherein the second status comprises an indication of whether each item is consumable or non-consumable.

4. The inventory system of claim 3, wherein the controller component is configured to, upon determining that the item has a second status of consumable and the first status changes to checked-out, remove a record of the item from the inventory of the collection of items.

5. The inventory system of claim 4, wherein the container is constructed of a material configured to prevent the transmission signal from entering the container.

6. The inventory system of claim 1, wherein the wireless return signal comprises an identifier corresponding to the item.

7. A wireless tracking system configured to track a collection of items stored within a container, the wireless tracking system comprises:
- a wireless transmitter affixed to an item of the collection of items within the container;
- a wireless RFID transceiver mounted to an exterior surface on top of the container at an angle between 0 degrees and 90 degrees, inclusive, as measured from a horizontal plane extending from the top of the container, wherein the wireless RFID transceiver is configured to transmit a transmission signal towards an area outside of an entrance to the container and receive a wireless return signal from the wireless transmitter when the wireless transmitter is energized by the transmission signal; and
- a controller component that is configured to determine an inventory of the collection of items in the container based at least partially on the wireless return signal received by the wireless RFID transceiver of the wireless tracking system, wherein the controller component is configured to store a first status of each item of the collection of items, wherein the first status comprises an indication of whether each item is checked-in or checked-out, and wherein the controller is configured to, upon receiving the wireless return signal from the wireless transmitter:
  - upon determining that the item has a checked-in first status, change the first status to checked-out, or
  - upon determining that the item has a checked-out first status, change the first status to checked-in.

8. The wireless tracking system of claim 2, wherein the controller component is configured to:
- store a second status of each item of the collection of items, wherein the second status comprises an indication of whether each item is consumable or non-consumable; and
- upon determining that the item has a second status of consumable and the first status changes to checked-out, remove a record of the item from the inventory of the collection of items.

9. The wireless tracking system of claim 7, wherein the wireless return signal comprises a serial number corresponding to the item.

10. A method for tracking a collection of items stored within a container, the method comprising:
- transmitting a transmission signal from a wireless RFID transceiver mounted to an exterior surface on top of the container at an angle between 0 degrees and 90 degrees, inclusive, as measured from a horizontal plane extending from the top of the container towards an area outside of an entrance to the container;
- receiving a wireless return signal from a wireless transmitter affixed to an item of the collection of items;
- identifying the item based upon the return signal;
- determining, upon receipt of the return signal, whether a first status corresponding to the item is either checked-in or checked-out; and
- updating the first status of the item by:
  - upon determining that the item has a checked-in first status, change the first status to checked-out, or
  - upon determining that the item has a checked-out first status, change the first status to checked-in.

11. The method of claim 10, further comprising:
- determining, upon receipt of the wireless return signal, whether a second status corresponding to the item is either consumable or non-consumable.

12. The method of claim 11, further comprising:
- upon determining that the item has a second status of consumable and the first status changes to checked-out, remove a record of the item from the inventory of the collection of items.

* * * * *